US012666204B2

(12) United States Patent
Kitamura et al.

(10) Patent No.: US 12,666,204 B2
(45) Date of Patent: Jun. 23, 2026

(54) TERMINAL, AUDIO COOPERATIVE REPRODUCTION SYSTEM, AND CONTENT DISPLAY APPARATUS

(71) Applicant: MAXELL, LTD., Kyoto (JP)

(72) Inventors: Shogo Kitamura, Tokyo (JP); Yuusuke Yatabe, Tokyo (JP); Takashi Matsubara, Tokyo (JP)

(73) Assignee: Maxell, Ltd., Kyoto (JP)

( * ) Notice: Subject to any disclaimer, the term of this patent is extended or adjusted under 35 U.S.C. 154(b) by 177 days.

(21) Appl. No.: 18/763,871

(22) Filed: Jul. 3, 2024

(65) Prior Publication Data

US 2024/0357293 A1 Oct. 24, 2024

Related U.S. Application Data

(63) Continuation of application No. 17/490,809, filed on Sep. 30, 2021, now Pat. No. 12,052,556, which is a (Continued)

(51) Int. Cl.
*H04R 5/04* (2006.01)
*H04R 3/12* (2006.01)

(52) U.S. Cl.
CPC ................. *H04R 5/04* (2013.01); *H04R 3/12* (2013.01); *H04R 2499/11* (2013.01); *H04R 2499/15* (2013.01)

(58) Field of Classification Search
CPC ........ H04R 5/04; H04R 3/12; H04R 2499/11; H04R 2499/15; G10K 11/178;
(Continued)

(56) References Cited

U.S. PATENT DOCUMENTS 8,976,978 B2 3/2015 Kitazawa et al.
11,413,188 B2 8/2022 Clauson et al.
(Continued)

FOREIGN PATENT DOCUMENTS

JP 2005-151214 A 6/2005
JP 2005-151443 A 6/2005
(Continued)

OTHER PUBLICATIONS

Notice of Reasons for Refusal received in Japanese Patent Application No. 2022-000181, mailed Oct. 10, 2023.
(Continued)

*Primary Examiner* — Mark Fischer
(74) *Attorney, Agent, or Firm* — Rimon P.C.

(57) ABSTRACT

A terminal is provided with a first audio output unit and a second audio output unit configured to output an audio content, and the terminal includes: an audio acquiring unit configured to acquire a first audio content and a second audio content; a setting unit configured to set information indicating an output destination of the first audio content and the second audio content; and an audio output controller configured to output the first audio content to one of the first audio output unit and the second audio output unit and output the second audio content to the other of the first audio output unit and the second audio output unit based on the information set by the setting unit.

20 Claims, 20 Drawing Sheets

Related U.S. Application Data continuation of application No. 16/637,121, filed as application No. PCT/JP2017/028700 on Aug. 8, 2017, now Pat. No. 11,140,484.

(58) Field of Classification Search

CPC .... H04M 1/00; H04M 11/00; H04M 1/72412; H04M 1/72439; H04M 1/72442; H04M 1/72454; H04N 21/4126; H04N 21/436; H04N 21/8106; H04N 21/8113; H04W 4/80

See application file for complete search history.

(56) References Cited

U.S. PATENT DOCUMENTS

| | | | | |
|---|---|---|---|---|
| 2009/0058845 | A1 | 3/2009 | Fukuda et al. | |
| 2014/0053216 | A1 | 2/2014 | Kamimaki et al. | |
| 2015/0194151 | A1* | 7/2015 | Jeyachandran | G10L 15/20 704/233 |
| 2016/0180863 | A1 | 6/2016 | Ozcan et al. | |

FOREIGN PATENT DOCUMENTS

| | | | |
|---|---|---|---|
| JP | 2006-197551 | A | 7/2006 |
| JP | 2008-005190 | A | 1/2008 |
| JP | 2011-254189 | A | 12/2011 |
| JP | 2013-236389 | A | 11/2013 |
| JP | 2016-225704 | A | 12/2016 |
| JP | 2019-535464 | A | 12/2019 |

OTHER PUBLICATIONS

Notice of Reasons for Refusal issued in corresponding JP Application No. 2022-000181, dated Apr. 4, 2023 w/ Machine English Translation.

International Search Report issued in corresponding International Patent Application No. PCT/JP2017/028700, dated Oct. 31, 2017, with Engish translation.

Office Action dated Mar. 18, 2025, issued in corresponding Japanese Patent Application No. 2024-060287, 10 pages.

Non-Final Rejection issued in Parent U.S. Appl. No. 16/637,121, dated Oct. 28, 2020.

English machine translation of JP 2005-151443 A (Ume et al., Information Equipment Equipped With Video Telephone Function, Communication System Equipped Information Equipment Communication Method By Information Equipment Equipped With Video Telephone Function, Program, and Record, published Jun. 2005).

Non-Final Rejection issued in Parent U.S. Appl. No. 17/490,809, dated May 11, 2023.

Notice of Allowance issued in Parent U.S. Appl. No. 17/490,809, dated Nov. 27, 2023.

Notice of Allowance issued in Parent U.S. Appl. No. 17/490,809, dated Mar. 25, 2024.

* cited by examiner

*FIG. 3*

| | No. | FIRST AUDIO SIGNAL | SECOND AUDIO SIGNAL |
|---|---|---|---|
| 22000 | 1 | NOT OUTPUT | NOT OUTPUT |
| 22001 | 2 | | SPEAKER |
| 22002 | 3 | | HEADPHONE |
| 22003 | 4 | SPEAKER | NOT OUTPUT |
| 22004 | 5 | | SPEAKER |
| 22005 | 6 | | HEADPHONE |
| 22006 | 7 | HEADPHONE | NOT OUTPUT |
| 22007 | 8 | | SPEAKER |
| 22008 | 9 | | HEADPHONE |

FIG. 6

| | ACQUISITION SOURCE | AUDIO CONTENT | AUDIO OUTPUT UNIT |
|---|---|---|---|
| 20000 | CONTENT DISPLAY APPARATUS | MAIN AUDIO | SPEAKER |
| | | SUB AUDIO | HEADPHONES |
| 20001 | PORTABLE INFORMATION TERMINAL | ALL CONTENTS | HEADPHONES |

*FIG. 21*

| | TRANSLATION PATTERN | SPEECH-TO-TEXT PROCESS (23004) | TRANSLATION PROCESS (23005) | TEXT-TO-SPEECH PROCESS (23006) |
|---|---|---|---|---|
| 23000 | SUBTITLE → SUBTITLE | UNNECESSARY | NECESSARY | UNNECESSARY |
| 23001 | SUBTITLE → AUDIO | | | NECESSARY |
| 23002 | AUDIO → SUBTITLE | NECESSARY | | UNNECESSARY |
| 23003 | AUDIO → AUDIO | | | NECESSARY |

TERMINAL, AUDIO COOPERATIVE REPRODUCTION SYSTEM, AND CONTENT DISPLAY APPARATUS

CROSS REFERENCE

This application is a Continuation under 35 U. S. C. § 111(a) of U. S. patent application Ser. No. 17/490,809, dated Sep. 30, 2021, which is a continuation of U.S. patent application Ser. No. 16/637,121, filed on Feb. 6, 2020, now U.S. Pat. No. 11,140,484, which is the U.S. National Phase under 35 U.S.C. § 371 of International Application No. PCT/JP2017/028700, filed on Aug. 8, 2017, the entire contents of which are hereby incorporated by reference.

TECHNICAL FIELD

The present invention relates to a terminal, an audio cooperative reproduction system, and a content display apparatus.

BACKGROUND ART

Conventionally, there is a technology in which unique ID information (identification information) is given to each of a plurality of sub-receiving terminal apparatuses capable of transmitting and receiving data to and from a main receiving terminal apparatus and a sub-content corresponding to the ID information is transmitted from the main receiving terminal apparatus to the sub-receiving terminal apparatuses (see, for example, Patent Document 1).

RELATED ART DOCUMENTS

Patent Documents

Patent Document 1: Japanese Patent Application Laid-Open Publication No. 2013-236389

SUMMARY OF THE INVENTION

Problems to be Solved by the Invention

In a system including a main receiving terminal apparatus (television receiver) and a sub-receiving terminal apparatus as described in Patent Document 1, each of the main receiving terminal apparatus and the sub-receiving terminal apparatus has an audio output unit. Also, one terminal apparatus has a plurality of audio output units (for example, speaker and headphones) in some cases.

When a plurality of audio output units are provided as described above, it is desirable to appropriately output an audio content. Therefore, an object is to provide a terminal, an audio cooperative reproduction system, and a content display apparatus capable of appropriately controlling output of an audio content of a plurality of audio output units as described above.

Means for Solving the Problems

As means for solving the problem mentioned above, the technology described in claims is used.

An example thereof is a terminal provided with a first audio output unit and a second audio output unit configured to output an audio content, the terminal including: an audio acquiring unit configured to acquire a first audio content and a second audio content; a setting unit configured to set information indicating an output destination of the first audio content and the second audio content; and an audio output controller configured to output the first audio content to one of the first audio output unit and the second audio output unit and output the second audio content to the other of the first audio output unit and the second audio output unit based on the information set by the setting unit.

Effects of the Invention

By using the technology of the present invention, it is possible to appropriately control the output of the audio content of a plurality of audio output units.

BRIEF DESCRIPTIONS OF THE DRAWINGS

FIG. 3 is a diagram for describing output patterns audio from output units of the portable information terminal according to the first embodiment;

FIG. 6 is an explanatory diagram of a default setting in audio output units of a portable information terminal of the audio cooperative reproduction system according to the second embodiment;

FIG. 21 is a diagram showing various processes required for translation of an audio cooperative reproduction system according to an eighth embodiment.

DETAILED DESCRIPTION OF PREFERRED EMBODIMENTS

Hereinafter, embodiments of the present invention will be described with reference to the drawings.

First Embodiment

First, an example of a content that can be reproduced by a portable information terminal (terminal) according to this embodiment will be described. An example of using a portable information terminal 700 (portable information terminal 700*mu*) will first be described with reference to FIG. 1. The portable information terminal 700 is, for example, a mobile phone, a smartphone, a tablet terminal, or the like. Also, the portable information terminal 700 may be a PDA (Personal Digital Assistants), a notebook PC, or the like. Further, the portable information terminal 700 may be a digital still camera, video camera capable of shooting moving images, a portable game machine, or other portable digital devices.

The portable information terminal 700 receives an audio content including audio data through an external network (for example, the Internet) and reproduces the audio content. Here, the audio content is a music content, a moving image content, a one-segment broadcast content, or the like. In addition, the portable information terminal 700 can receive a one-segment broadcast wave, and receives a one-segment broadcast content and reproduces the one-segment content.

The portable information terminal 700 includes a plurality of audio output units and can output audio from the audio output units. Specifically, the portable information terminal 700 can output audio from a speaker and headphones connected to the terminal.

Further, the portable information terminal 700 can make a call through the external network or the mobile phone communication network. Namely, the portable information terminal 700 can make a call by using the telephone network. Further, the portable information terminal 700 makes a call through the external network or the mobile phone communication network, receives a call audio, and transmits call data to the call partner. In addition, the information portable terminal 700 reproduces a music content stored in advance. The description above is not limited to the application only in Japan.

Figure 1:
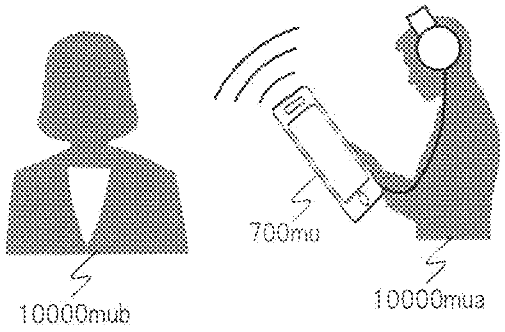
FIG. 1 is a diagram showing an example of using a portable information terminal according to a first embodiment.

FIG. 1 is a schematic diagram showing two types of content viewing. The portable information terminal 700 is reproducing a streaming content and a music content. Here, it is assumed that an A user 10000*mua* wants to view the streaming content, while a B user 10000*mub* wants to listen to the music content.

In this case, a headphone audio output unit of the portable information terminal 700*mu* reproduces the audio of the streaming content, and a speaker audio output unit of the portable information terminal 700*mu* reproduces the music content. In this case, the A user 10000*mua* can view the streaming content and the B user 10000*mub* can listen to the music content without disturbing the viewing and listening of the other content.

[Hardware Configuration of Portable Information Terminal]

Figure 2:
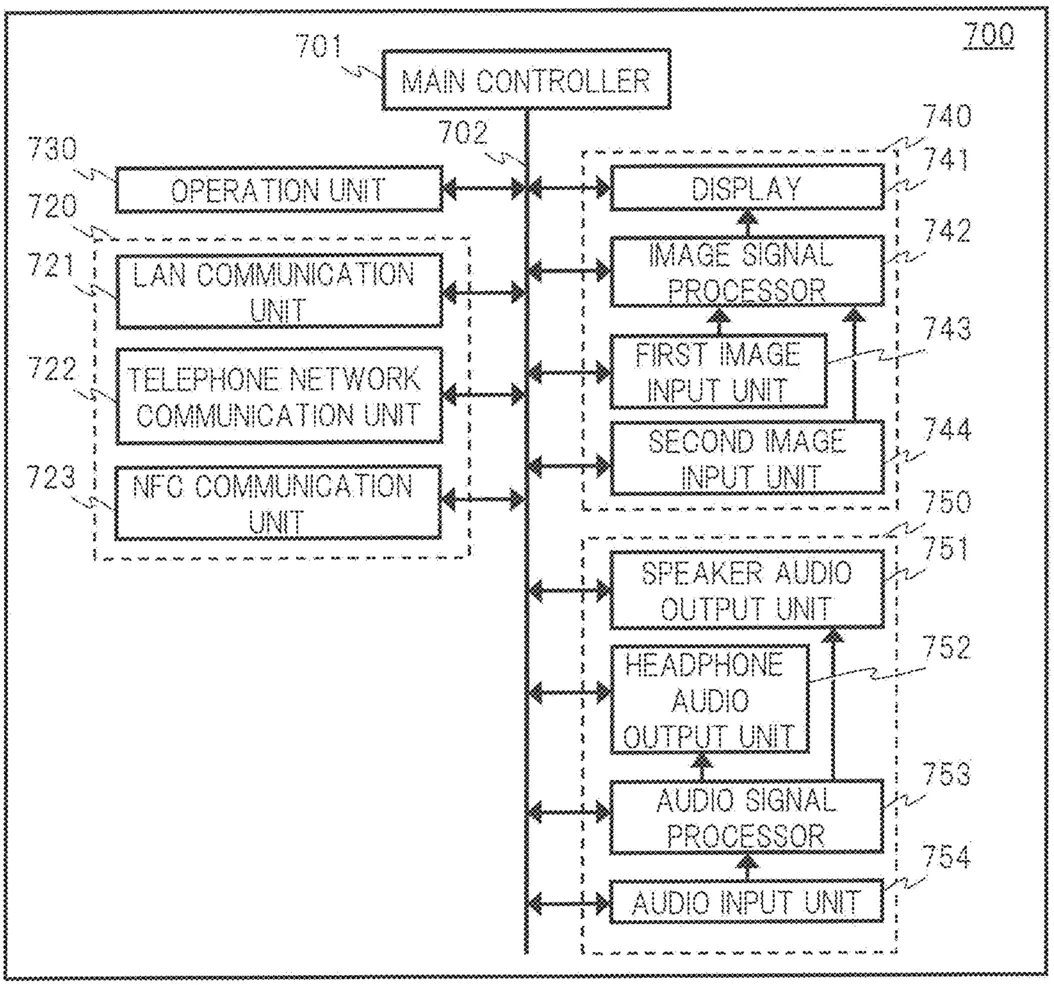
FIG. 2 is a block diagram of the portable information terminal according to the first embodiment.

Next, a specific configuration example in this embodiment will be described. FIG. 2 is a block diagram showing an example of an internal configuration of the portable information terminal 700. The portable information terminal 700 includes a main controller 701, a system bus 702, a communication processor 720 (receiver), an operation unit 730, an image processor 740 (display controller), and an audio processor 750.

The main controller 701 is a microprocessor unit that controls the overall portable information terminal 700. The main controller 701 acquires a plurality of audio contents such as a broadcast content and a moving image content via the communication processor 720. Also, the main controller 701 may store the acquired content. In this manner, the main controller 701 functions as an audio acquiring unit.

A content reproduction application (for example, an audio cooperative reproduction application) and a calling application are installed in the main controller 701, and the main controller 701 executes these applications in response to a user operation request or the like. The content reproduction application reproduces various audio contents. For example, it reproduces the acquired audio content. Also, the audio cooperative reproduction application is an application that reproduces audio data acquired from the television receiver. The operation of this audio cooperative application will be described later. The calling application is an application that controls outgoing and incoming calls.

When the content reproduction application mentioned above accepts a content reproduction request, the main controller 701 sends the acquired content or the stored content to the image processor 740 or the audio processor 750. In addition, the main controller 701 performs outgoing/incoming call control by telephone and call control using a speaker audio output unit 751 and an audio input unit 754 by the above-described calling application. The system bus 702 is a data communication path for transmitting and receiving data between the main controller 701 and each operation block in the portable information terminal 700.

The communication processor 720 includes a LAN communication unit 721, a mobile phone network communication unit 722, and an NFC communication unit 723. The LAN communication unit 721 transmits and receives data through the Internet. The mobile phone network communication unit 722 performs telephone communication (call) and data transmission/reception via the mobile phone communication network.

The NFC communication unit 723 performs wireless communication when close to the corresponding reader/writer. The LAN communication unit 721, the mobile phone network communication unit 722, and the NFC communication unit 723 are each assumed to have a coding circuit, a decoding circuit, an antenna, and the like. In addition, the communication processor 720 may further include another communication unit such as a BlueTooth (registered trademark) communication unit or an infrared communication unit. For example, the communication processor 720 receives a content transmitted from an external apparatus (for example, a television receiver).

The operation unit 730 is an instruction input unit to which an operation instruction to the portable information terminal 700 is input, and the operation unit 730 is assumed to be configured of a touch panel disposed over a display 741 and an operation key in which button switches are arranged in this embodiment. The operation unit 730 may be configured of either one of them. The portable information terminal 700 may be operated by using a separate portable terminal device connected by wired communication or wireless communication. Also, the touch panel function may be provided in the display 741.

The image processor 740 includes a display 741, an image signal processor 742, a first image input unit 743, and a second image input unit 744. The display 741 is, for example, a display device such as a liquid crystal panel and provides the image data processed by the image signal processor 742 to the user of the portable information terminal 700 (display output). The image signal processor 742 includes a video RAM (not shown), and the display 741 is driven based on the image data input to the video RAM.

In addition, the image signal processor 742 is assumed to have a function of performing format conversion, superimposition process of menu and other OSD (On Screen Display) signals, and others as necessary. The first image input unit 743 and the second image input unit 744 are, for example, a camera unit. This camera unit inputs image data of surroundings and objects by converting light input from the lens into an electrical signal by using an electronic device such as a CCD (Charge Coupled Device) or CMOS (Complementary Metal Oxide Semiconductor) sensor.

The audio processor 750 includes a speaker audio output unit 751 (first audio output unit), a headphone audio output unit 752 (second audio output unit), an audio signal processor 753 (audio output controller, analysis unit, calculator), and an audio input unit 754 (input unit).

The speaker audio output unit 751 provides the audio signal processed by the audio signal processor 753 to all users within the range where the output speaker audio can be heard. The headphone audio output unit 752 provides the audio signal processed by the audio signal processor 753 to the user of the portable information terminal 700. The headphone audio output unit 752 may include a terminal to which headphones or earphones can be connected. Further, the headphone audio output unit 752 may output an audio signal wirelessly through BlueTooth (registered trademark) communication (short-range wireless communication) or the like. As described above, the portable information terminal 700 is a terminal provided with a plurality of audio output units configured to output the audio content.

Also, the audio signal processor 753 can process two or more audio signals in order to output different audio signals from the speaker audio output unit 751 and the headphone audio output unit 752. The audio signals output from the speaker audio output unit 751 and the headphone audio output unit 752 are selectively controlled by the main controller 701.

The audio signals output from the speaker audio output unit 751 and the headphone audio output unit 752 may be monaural signals or stereo signals. The audio input unit 754 is a microphone, and it converts a voice of the user and the like into audio data and inputs the audio data.

The audio signal processor 753 sets output pattern information, which will be described later, via the operation unit 730, and stores the set output pattern information. Thus, the audio signal processor 753 functions as a setting unit. Also, the audio signal processor 753 outputs the first audio content to one of the first audio output unit and the second audio output unit and outputs the second audio content to the other of the first audio output unit and the second audio output unit based on the output pattern information.

Note that the configuration example of the portable information terminal 700 shown in FIG. 2 includes many components that are not essential to this embodiment. However, even in the configuration in which these components are not provided, the effects of this embodiment are not impaired. Further, components not shown in the drawing such as a digital broadcast receiving function and an electronic money settlement function may be further added.

[Output Pattern of Audio Signal]

FIG. 3 is a diagram showing an example of output patterns when the first audio signal or the second audio signal is output from the speaker audio output unit 751 and the headphone audio output unit 752 in the portable information terminal 700. Each audio signal has three patterns of "not output", "output from the speaker audio output unit 751", and "output from the headphone audio output unit 752", and nine patterns ($3\times3=9$) can be taken as the combination of the two types of audio signals. The two types of audio signals are both signals of audio contents. The first audio signal is, for example, a signal of moving image content, and the second audio signal is, for example, a signal of music content.

Specifically, there are No. 1 output pattern 22000 to No. 9 output pattern 22008 shown in FIG. 3. Among these, the patterns for outputting both the first audio signal and the second audio signal are the four patterns of No. 5 output pattern 22004, No. 6 output pattern 22005, No. 8 output pattern 22007, and No. 9 output pattern 22008. In particular, No. 5 output pattern 22004 and No. 9 output pattern 22008 output the first audio signal and the second audio signal while superimposing them.

These output patterns may be selected manually by the user via the operation unit 730, or may be selected automatically based on the detection result of a headphone connection detector provided to determine the connection of headphones. The main controller 701 implements the headphone connection detector by detecting a terminal connection state or detecting a headphone connection by short-range wireless communication.

The setting shown in FIG. 3 is merely an example, and when the portable information terminal 700 includes another audio output unit, selection of another audio output unit is allowed, and the output of the same audio signal from a plurality of audio output units is also allowed.

Figure 4:
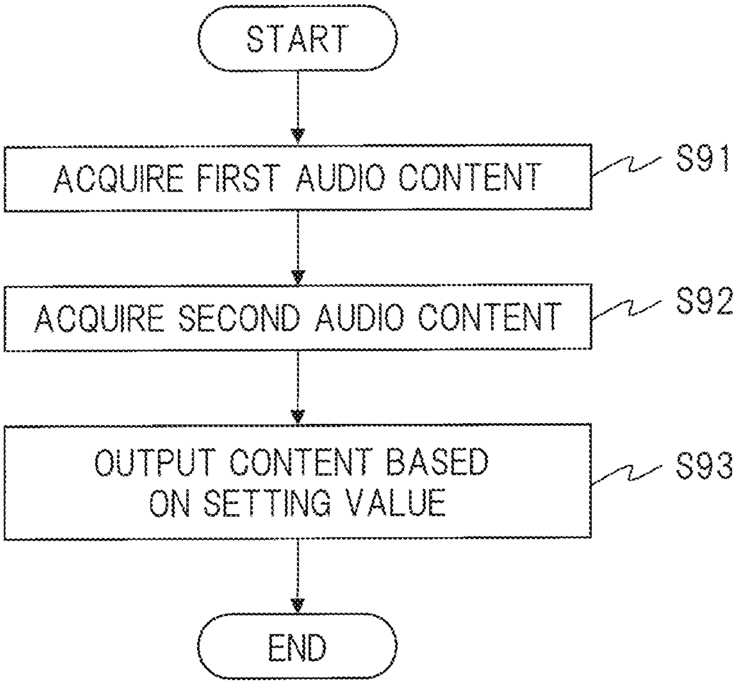
FIG. 4 is a flow chart showing a process of the portable information terminal according to the first embodiment.

Next, a procedure of the process in which the portable information terminal 700 switches the output of the audio signals will be described with reference to FIG. 4. FIG. 4 is a flow chart showing the procedure of the process in which the portable information terminal 700 switches the output of the audio signals. Note that it is assumed that the output pattern is set in advance.

First, the main controller 701 acquires the first audio content (first audio signal) (step S91), and further acquires the second audio content (second audio signal) (step S92). The audio signal processor 753 outputs the first audio content to one of the first audio output unit and the second audio output unit and outputs the second audio content to the other of the first audio output unit and the second audio output unit with reference to the output pattern (setting value) (step S93).

As described above, according to the portable information terminal 700 described in the first embodiment, the output pattern is set in advance, and the first audio signal is output to one of the first audio output unit and the second audio output unit and the second audio signal is output to the other of the first audio output unit and the second audio output unit based on the output pattern. For example, the portable information terminal 700 can output a music content from the speaker audio output unit 751 and output a video content from the headphone audio output unit 752. As described above, the portable information terminal 700 can appropriately control the output of audio contents by using a plurality of audio output units.

Second Embodiment

The second embodiment of the present invention will be described. This embodiment is an audio cooperative reproduction system using the portable information terminal described in the first embodiment. Note that the configuration, effects, and the like of the portable information terminal in this embodiment are the same as those in the first embodiment unless otherwise specified.

First, an example of the content that can be reproduced by the audio cooperative reproduction system of this embodiment will be described. In the audio cooperative reproduction system of this embodiment, a content display apparatus that is, for example, a television receiver receives a broadcast wave via an antenna, so that a BS/terrestrial digital broadcast can be reproduced.

Further, when the content display apparatus can be connected to an external network, it is possible to receive and reproduce the streaming content through the external network. On the other hand, it is possible to transmit the streaming content received by the portable information terminal through the external network to the content display apparatus and reproduce the content thereon.

Furthermore, when the portable information terminal 700 can receive the one-segment broadcast wave, it is possible to transmit the one-segment broadcast content to the content display apparatus and reproduce the content thereon. The description above is not limited to the application only in Japan.

Next, a specific configuration example of the embodiment will be described.

[System Configuration]

Figure 5A:
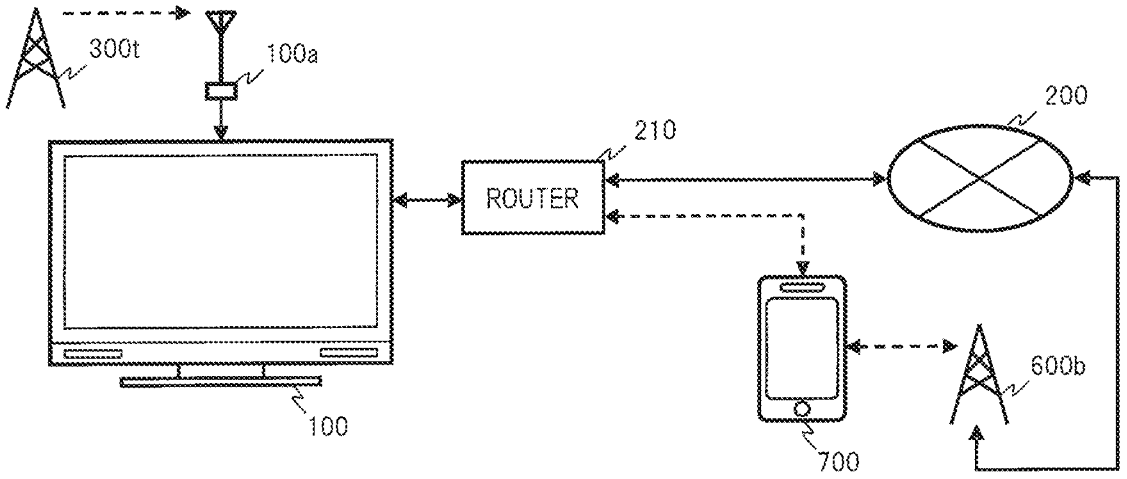
FIG. 5A is a system configuration diagram (1) of an audio cooperative reproduction system according to a second embodiment.
Figure 5B:
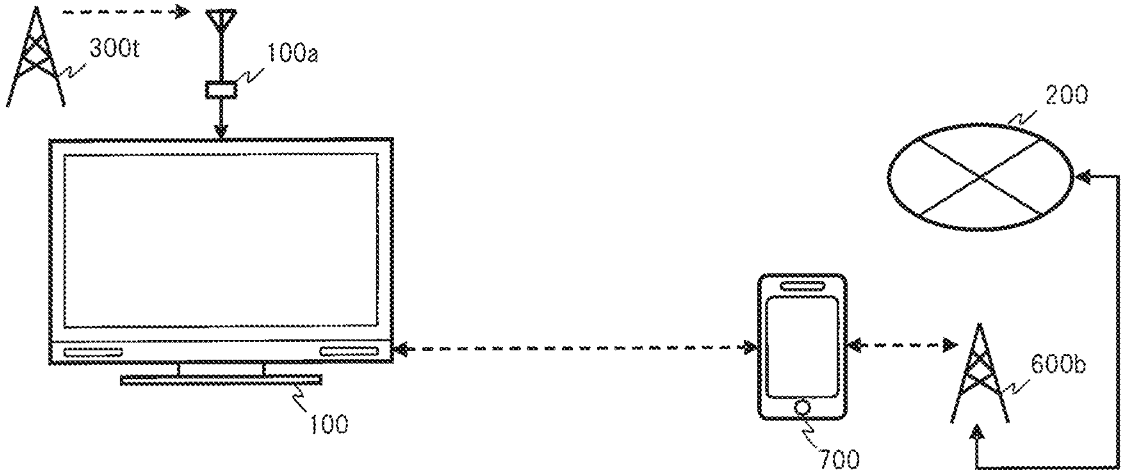
FIG. 5B is a system configuration diagram (2) of the audio cooperative reproduction system according to the second embodiment.
Figure 5C:
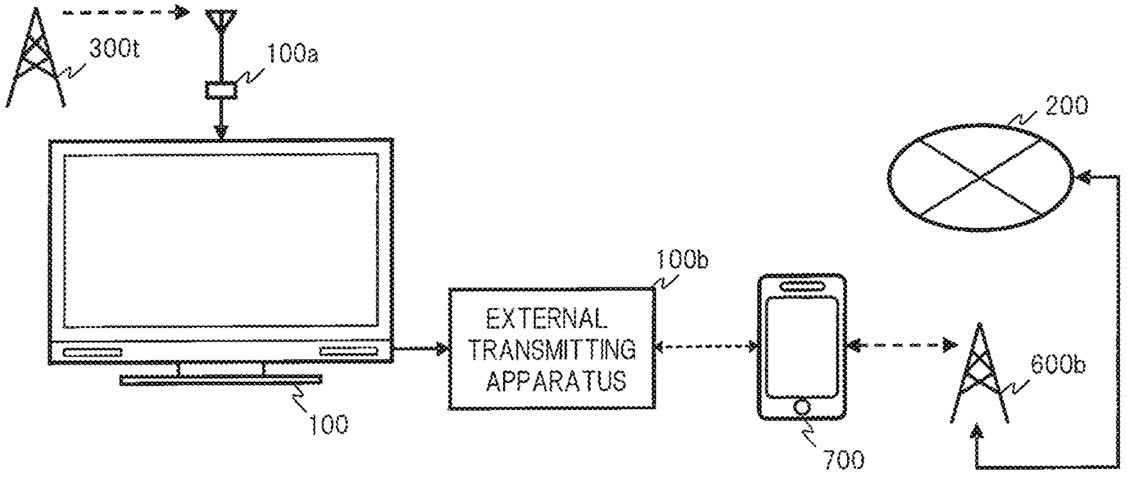
FIG. 5C is a system configuration diagram (3) of the audio cooperative reproduction system according to the second embodiment.

First, the system configuration of the audio cooperative reproduction system will be described with reference to FIG. 5 (FIGS. 5A to 5C). FIG. 5 is a diagram showing a system configuration of the audio cooperative reproduction system. FIG. 5A is a system configuration diagram showing an example of the audio cooperative reproduction system according to this embodiment. The audio cooperative reproduction system of this embodiment includes a content display apparatus 100, an antenna 100*a*, Internet 200 as a broadband network or the like, a router 210, a radio tower 300*t* of a broadcasting station, a base station 600*b* of a mobile phone communication network, and the portable information terminal 700.

The content display apparatus 100 is a television receiver having a function corresponding to a broadcasting/communication cooperation system in addition to an existing digital broadcast receiving function. The content display apparatus 100 receives the broadcast wave transmitted from the radio tower 300*t* via the antenna 100*a*. In addition, the content display apparatus 100 can be connected to the Internet 200 via the router 210, and can transmit and receive data by communication with each server on the Internet 200.

The router 210 is connected to the Internet 200 by wireless communication or wired communication, is connected to the content display apparatus 100 by wireless communication or wired communication, and is connected to the portable information terminal 700 by wireless communication. Thus, each server on the Internet 200, the content display apparatus 100, and the portable information terminal 700 can mutually transmit and receive data via the router 210. Namely, the content display apparatus 100 and the portable information terminal 700 can communicate with each other. The radio tower 300*t* transmits a broadcast wave including a digital broadcast signal and the like from the broadcasting facility of the broadcasting station.

FIG. 5B is a system configuration diagram showing another example of the audio cooperative reproduction system according to this embodiment. Unlike the system configuration shown in FIG. 5A, the router 210 is not provided. In the system configuration shown in FIG. 5B, the communication between the content display apparatus 100 and the portable information terminal 700 is performed by using a system such as BlueTooth (registered trademark) instead of passing through the router 210.

FIG. 5C is a system configuration diagram showing another example of the audio cooperative reproduction system according to this embodiment. Unlike the system configuration shown in FIG. 5B, an external transmitting apparatus 100*b* is used.

When the content display apparatus 100 cannot be connected to the router 210 or does not have a communication system such as BlueTooth (registered trademark), the content display apparatus 100 transmits an audio signal or the like to the portable information terminal 700 via the external transmitting apparatus 100*b*.

The three system configurations shown in FIGS. 5A to 5C are different in the communication system between the content display apparatus 100 and the portable information terminal 700, but are not limited to any one communication system, and two or more communication systems may be used in combination. As described above, the content display apparatus 100 transmits various types of information (for example, audio data in digital broadcasting) to the portable information terminal 700 by using various communication means (router 210, external transmitting apparatus 100*b*, and the like). The portable information terminal 700 accordingly receives the information. Also, the audio data transmitted from the content display apparatus 100 to the portable information terminal 700 includes information indicating the type of main audio or sub audio.

Note that the main controller 701 of the portable information terminal 700 stores an application for cooperation with the content display apparatus 100 as described above. When the portable information terminal 700 activates the application, the portable information terminal 700 performs an authentication process with the content display apparatus 100. Further, the portable information terminal 700 stores volume reference information in advance, and outputs the received information (audio data) based on the volume reference information.

[Output Pattern of Audio Signal]

Incidentally, since the audio cooperative reproduction system of this embodiment uses the portable information terminal 700 of the first embodiment, it is possible to output the first audio signal or the second audio signal from the speaker audio output unit 751 and the headphone audio output unit 752. For example, the audio output from a speaker 174 of the content display apparatus 100 can be output from the speaker audio output unit 751 of the portable information terminal 700, and the audio signal of another audio content such as a moving image content on the network can be output from the headphone audio output unit 752. The portable information terminal 700 stores in advance an output pattern in which an output destination of the data to be output is determined for each acquisition source.

FIG. 6 is a diagram showing an example of a default setting related to the audio output units in the case where various audio contents are reproduced in the portable information terminal 700. As for a content 20000 for displaying video on the content display apparatus 100, the default setting is to output the main audio heard by many users from the speaker audio output unit 751 and to output the sub audio from the headphone audio output unit 752.

On the other hand, as for a content 20001 for displaying video on the portable information terminal 700, the user who views the content is basically only one person who possesses the portable information terminal 700, and thus the default setting is to output the audio from the headphone audio output unit 752 regardless of the type of the audio content.

When based on the default setting shown in FIG. 6, since the sub audio of the content 20000 and the audio signal of the content 20001 cannot be output if the headphones are removed, only the main audio of the content 20000 is output from the speaker audio output unit 751. In addition, the audio signal processor 753 outputs the audio signal of the main audio of the content 20000 from the speaker audio output unit 751 when the headphones are connected. Further, the audio signal processor 753 outputs the sub audio of the content 20000 or the audio signal of the content 20001 from the headphone audio output unit 752. When the connection of the headphones is released, the audio signal processor 753 interrupts the output of the audio signal from the headphone audio output unit 752.

The setting shown in FIG. 6 is just a default setting, and the setting of each audio output in FIG. 6 allows selection of the other output unit.

[Hardware Configuration of Content Display Apparatus]

Figure 7:
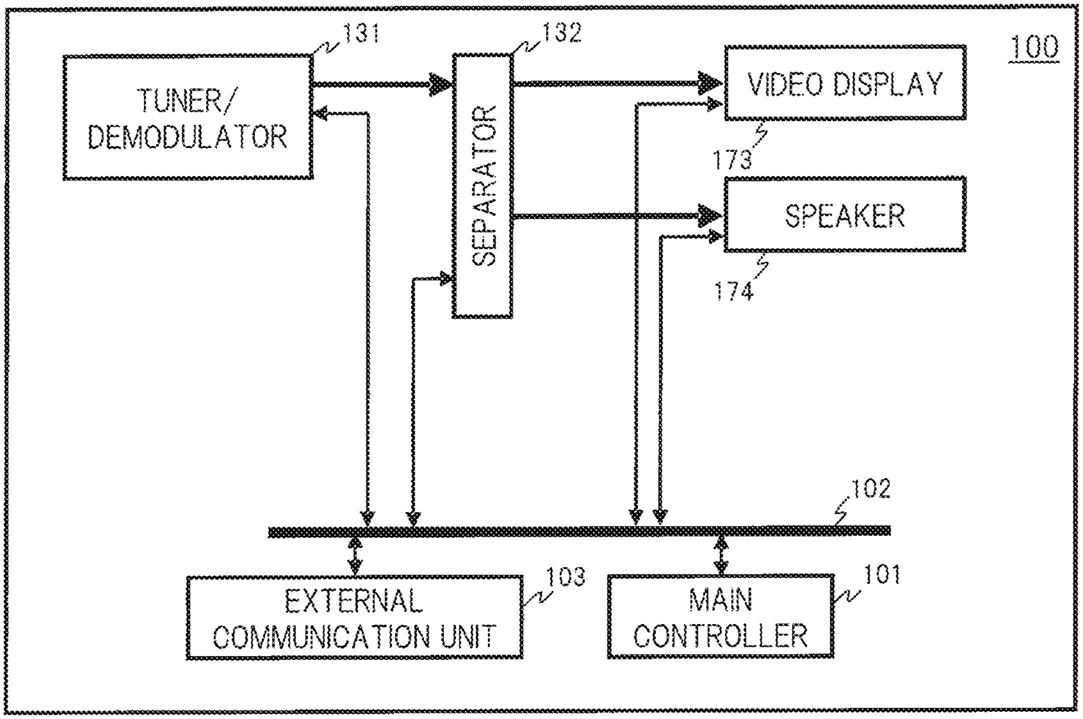
FIG. 7 is a block diagram of a content display apparatus according to the second embodiment.

FIG. 7 is a block diagram showing an example of an internal configuration of the content display apparatus 100. The content display apparatus 100 includes a main controller 101, a system bus 102, an external communication unit 103, a tuner/demodulator 131, a separator 132, a video display 173, and a speaker 174 (third audio output unit).

The main controller 101 is a microprocessor unit that controls the overall content display apparatus 100 in accordance with a predetermined operation program. The system bus 102 is a data communication path for transmitting and receiving data between the main controller 101 and each operation block in the content display apparatus 100.

When the external communication unit 103 includes, for example, a LAN (Local Area Network) communication unit, it is possible to configure the system to receive the streaming content from the Internet via the router 210 and communicate with the portable information terminal 700 as shown in FIG. 5A. Further, when the external communication unit 103 includes, for example, a Bluetooth (registered trademark) communication unit, it is possible to configure the system to directly communicate with the portable information terminal 700 as shown in FIG. 5B.

Further, when the external communication unit 103 includes, for example, an audio output unit, it is possible to transmit the audio information to the portable information terminal 700 via the external transmitting apparatus **100*b* as illustrated in FIG. 5C. The communication systems by the LAN communication unit, the BlueTooth communication unit, and the audio output unit are not limited to any one communication system, and two or more communication systems may be used in combination. Also, the external communication unit 103** may further include other communication units such as an NFC communication unit and an infrared communication unit.

When the external communication unit 103 receives audio data from the separator 132 described later, the external communication unit 103 transmits the audio data to the portable information terminal 700. Note that the external communication unit 103 may be configured to transmit the content received by the tuner/demodulator 131 to the portable information terminal 700.

The tuner/demodulator 131 receives a broadcast wave from the radio tower **300*t* via the antenna 100*a*, and tunes to a channel of the service desired by the user based on the control of the main controller 101. Further, the tuner/demodulator 131 demodulates the received broadcast signal to acquire a transport stream (TS). Note that the example in FIG. 6 shows a configuration in which there is one tuner/demodulator, but the content display apparatus 100** may be configured to include a plurality of tuner/demodulators for the purpose of simultaneous multi-screen display, recording of a program on a different channel, and the like.

The separator 132 receives the TS output from the tuner/demodulator 131, separates the TS into respective data strings such as a video data string, an audio data string, and a subtitle data string, and outputs the data strings. In this manner, the separator 132 acquires video data and audio data from the received content (TS). The video display 173 is a display device such as a liquid crystal panel and provides the video information and the subtitle information separated by the separator 132 to the user of the content display apparatus 100. The speaker 174 provides the audio information separated by the separator 132 to the user of the content display apparatus 100.

The content display apparatus 100 may be an optical disc drive recorder such as a DVD (Digital Versatile Disc) recorder, a magnetic disc drive recorder such as an HDD recorder, an STB (Set Top Box), or the like other than the television receiver. It may be a PC (Personal Computer), a tablet terminal, a game machine or the like having a digital broadcast receiving function and a broadcasting/communication cooperation function. When the content display apparatus 100 is a DVD recorder, an HDD recorder, an STB, or the like, the video display 173 and the speaker 174 may not be provided. By connecting an external monitor and an external speaker to the external communication unit 103, an operation similar to that of the content display apparatus 100 of this embodiment is possible.

[Hardware Configuration of External Transmitting Apparatus]

Figure 8:
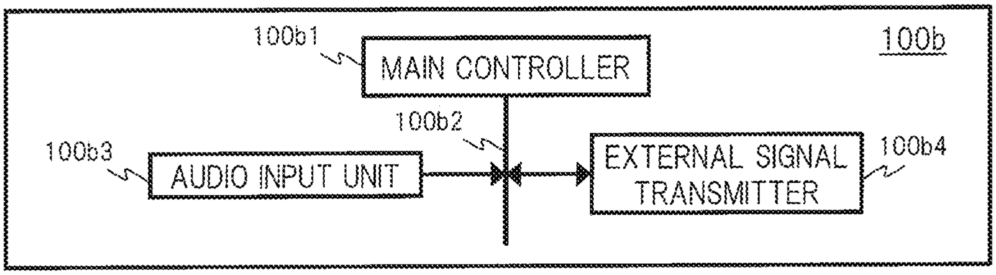
FIG. 8 is a block diagram of an external transmitting apparatus according to the second embodiment.

FIG. 8 is a block diagram showing an example of an internal configuration of the external transmitting apparatus used when audio cooperative **100*b* the reproduction system of this embodiment takes, for example, the system configuration shown in FIG. 5C. The external transmitting apparatus 100*b* includes a main controller 100*b*1, a system bus 100*b*2, an audio input unit 100*b*3, and an external signal transmitter 100*b*4**.

The main controller **100*b*1 is a microprocessor unit that controls the overall external transmitting apparatus 100*b* in accordance with a predetermined operation program. The system bus 100*b*2 is a data communication path for transmitting and receiving data between the main controller 100*b*1 and each operation block in the external transmitting apparatus 100*b***.

The audio input unit **100*b*3 acquires the audio signal output from the audio output unit provided in the external communication unit 103 in the content display apparatus 100**.

The external signal transmitter **100*b*4 includes, for example, a BlueTooth (registered trademark) communication unit, converts the audio signal acquired by the audio input unit, and transmits the converted audio signal to the outside of the apparatus. The external signal transmitter 100*b*4** may further include other communication units such as an NFC communication unit and an infrared communication unit.

When the external communication unit 103 in the content display apparatus 100 includes, for example, a video output unit, the video signal can be output to the outside of the apparatus by, for example, BlueTooth (registered trademark) communication if the external transmitting apparatus **100*b* includes a video input unit. The audio signal and the video signal may be input by respectively independent terminals, or the audio signal and the video signal may be input simultaneously through an HDMI terminal or the like. Also, when the audio signal and the video signal are input together, the information transmitted by the external signal transmitter 100*b*4** may be both the audio signal and the video signal or only the audio signal.

[Operation Sequence in Audio Cooperative Reproduction]

Figure 9:
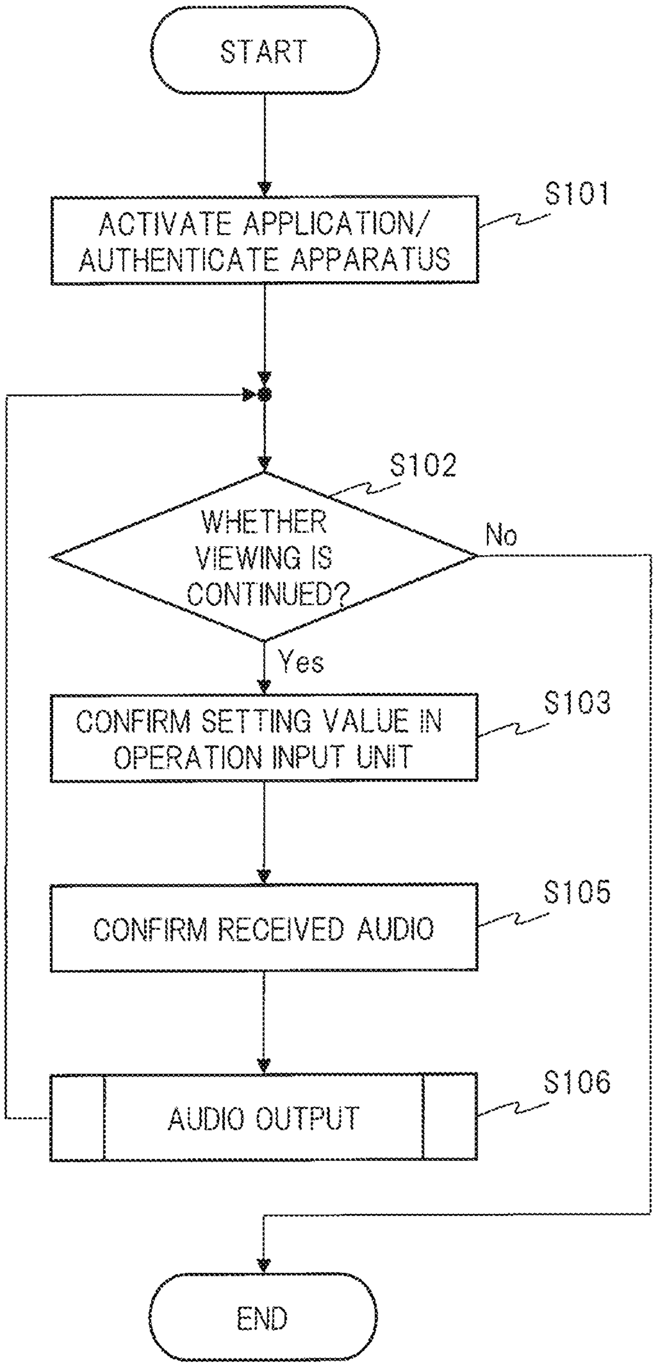
FIG. 9 is a flow chart (1) showing a process of the portable information terminal according to the second embodiment.

FIG. 9 is an operation sequence diagram showing an example of the operation sequence of the portable information terminal 700 when operating the audio cooperative reproduction system of this embodiment. FIG. 9 shows a series of flows from when the portable information terminal 700 activates an application for operating the audio cooperative reproduction system of this embodiment to when viewing of the content is continued and then finished.

First, the portable information terminal 700 activates the application for operating the audio cooperative reproduction system of this embodiment (S101), and authenticates the content display apparatus 100 to cooperate. When the audio cooperative reproduction system of this embodiment constitutes the system shown in FIG. 5A, the portable information terminal 700 performs authentication by inputting a password or the like through the network. When the audio cooperative reproduction system of this embodiment constitutes the system shown in FIG. 5B, the portable information terminal 700 performs authentication of the content display apparatus 100 by a pairing operation or the like.

When the audio cooperative reproduction system of this embodiment constitutes the system shown in FIG. 5C, the portable information terminal 700 authenticates the external transmitting apparatus **100*b* by a pairing operation or the like. Note that, when the content display apparatus 100 or the external transmitting apparatus 100*b* includes an NFC communication unit, the portable information terminal 700 may directly authenticate the content display apparatus 100 or the external transmitting apparatus 100*b* via the NFC communication unit 723**.

Further, the authentication may be performed by displaying a QR code on the video display 173 of the content display apparatus 100 by a user operation and processing the QR code by image processing by the image processor 740 of the portable information terminal 700. In particular, since the audio cooperative reproduction system of this embodiment assumes that the content is viewed by multiple users such as family members, the method using the NFC communication and the QR code is easy to operate, and it is possible to start the cooperation easily even by the children and the elderly.

When the activation of the application for operating the audio cooperative reproduction system of this embodiment and the authentication of each apparatus are completed, the audio cooperative reproduction is started. The portable information terminal 700 can set a reference reproduction volume or the like via the operation unit 730 in order to reduce the difference in how audio is heard due to individual differences. After confirming the setting value set by the operation unit 730 or the like (S103), the audio signal processor 753 confirms the received audio received from the communication processor 720 (S105), and outputs the received audio from the speaker audio output unit 751 or the headphone audio output unit 752 (S106).

Whether or not the audio cooperative reproduction is continued is constantly monitored in the processing loop of S103 to S106 (S102). When an application interruption/end request is input from the operation unit 730 or when the communication between the content display apparatus 100 and the portable information terminal 700 is interrupted due to the power supply of the content display apparatus 100 being cut off, the audio cooperative reproduction system of this embodiment is ended. Through the process above, the operation of the audio cooperative reproduction system of this embodiment by the content display apparatus 100 and the portable information terminal 700 becomes possible.

Figure 10:
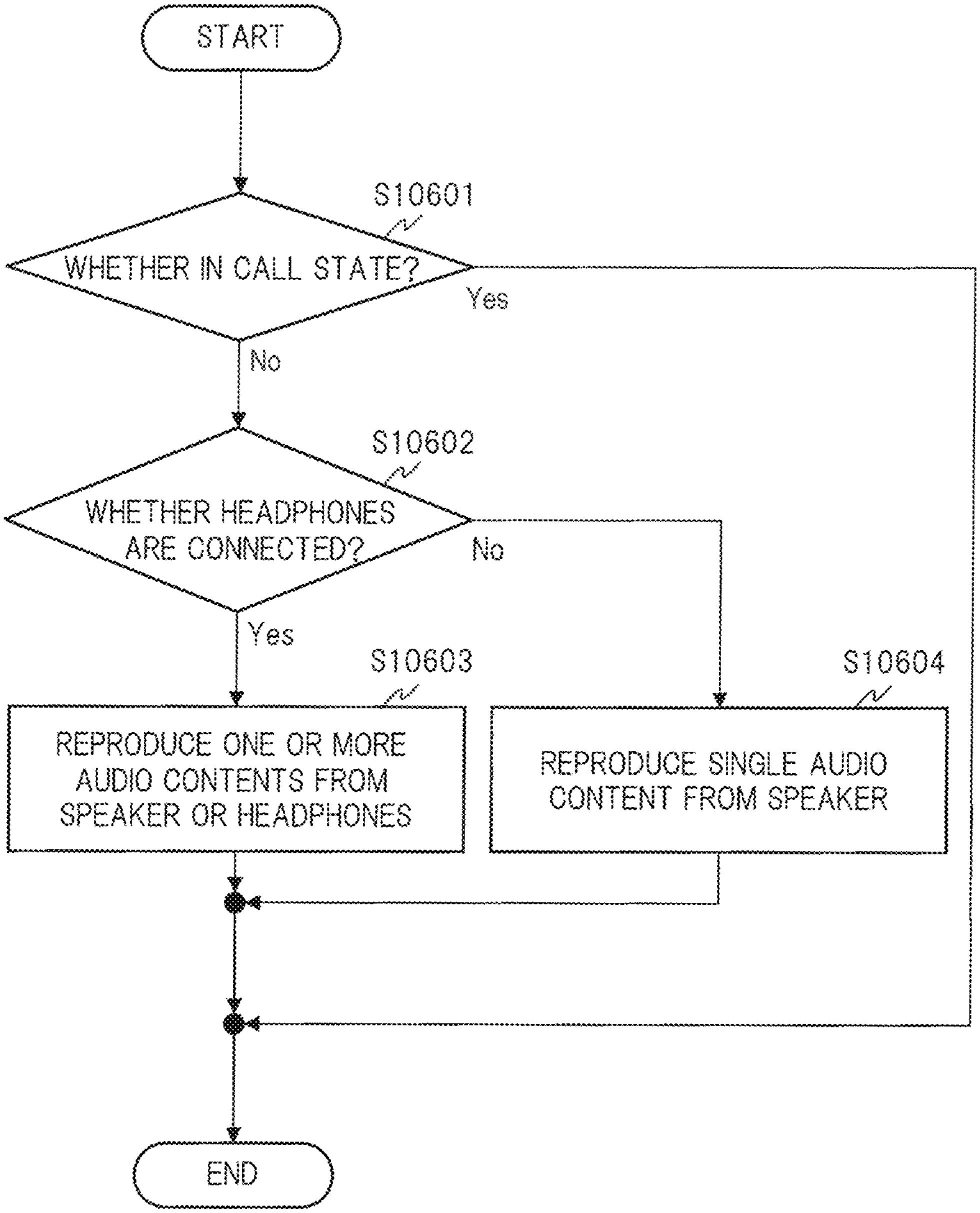
FIG. 10 is a flow chart (2) showing a process of the portable information terminal according to the second embodiment.

FIG. 10 is an operation sequence diagram showing an example of a detailed operation sequence of the audio output (S106) in the example of the operation sequence of the portable information terminal 700 shown in FIG. 9. First, before outputting audio, the audio signal processor 753 confirms whether or not the portable information terminal 700 is in a call state (S10601).

Specifically, the audio signal processor 753 determines it by inquiring of the main controller 701 about a call state and acquiring information indicating whether or not a call is in progress from the main controller 701. If the portable information terminal 700 is in a call state (S10601: Yes), the audio signal processor 753 ends the process without outputting any audio signals so as not to interfere with listening to the incoming audio.

On the other hand, if the portable information terminal 700 is not in a call state (S10601: No), the audio signal processor 753 determines that it is possible to reproduce the audio signal, and then performs a connection determination by the headphone connection detector (S10602). Since it is possible to reproduce two or more audio signals when headphones are connected (S10602: Yes), the audio signal processor 753 outputs one or two audio signals by using one or both of the speaker audio output unit 751 and the headphone audio output unit 752 (S10603).

On the other hand, when headphones are not connected, since only the speaker audio output unit 751 can output audio, the audio signal processor 753 reproduces a single audio signal from the speaker audio output unit 751 (S10604). The selection of the audio signal to be output in the processes of S10603 and S10604 may be made in the process of S103, or may be made based on a preset default setting.

When the portable information terminal 700 receives an incoming call while the audio signal is being reproduced based on the operation sequence shown in FIG. 10, the determination in the process of S10601 changes, and the audio signal processor 753 interrupts the output of the audio signal. When the call is finished, the audio signal processor

753 changes the determination in the process of S10601 again and restarts the output of the audio signal.

Further, when the connection of the headphones is released in the state where the headphones are connected and the audio signals are being reproduced from both the speaker audio output unit 751 and the headphone audio output unit 752, respectively, the determination in the process of S10602 changes, and the output of the audio signal from the headphone audio output unit 752 is interrupted. When the headphones are connected, the audio signal processor 753 changes the selection in the process of S10602 again, and restarts the output of the audio signal from the headphone audio output unit 752.

It is assumed that each operation sequence in FIGS. 9 and 10 can be partially combined as appropriate, and some operation steps can be reordered and performed simultaneously with other operation steps as appropriate. In addition, it is assumed that each operation sequence in FIGS. 9 and 10 can be performed as a background operation except for the input of the user operation, and does not hinder the use of another application by the user.

[Example of Using Audio Cooperative Reproduction System of This Embodiment]

Figure 11A:
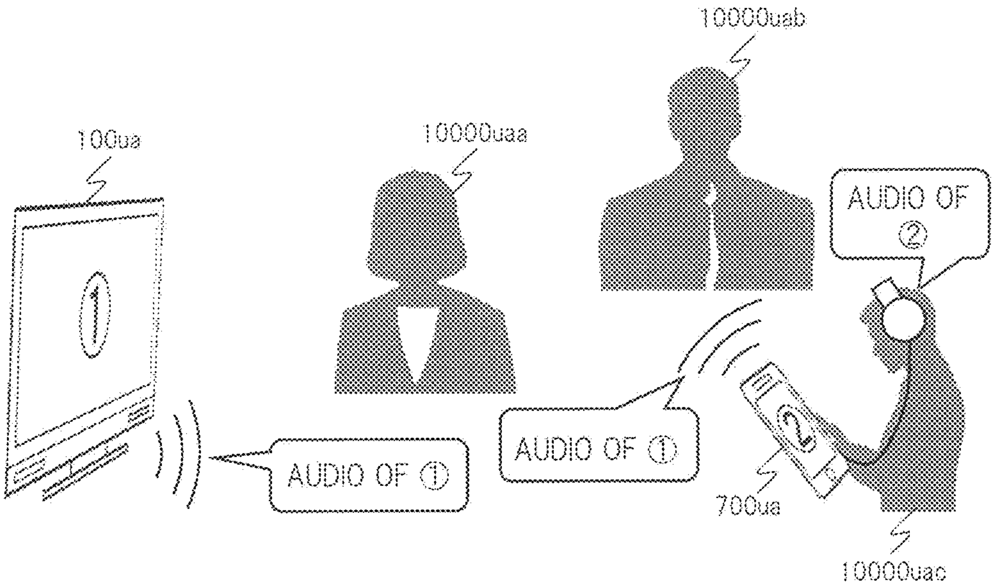
FIG. 11A is a diagram (1) showing an example of using the audio cooperative reproduction system according to the second embodiment.

FIG. 11A is a schematic diagram showing two types of content viewing, which is an example of using the audio cooperative reproduction system of this embodiment. An A user 10000*uaa* and a B user 10000*uab* are viewing the content reproduced by the video display 173 of a content display apparatus 100*ua*. The B user 10000*uab* is located farther from the content display apparatus 100*ua* than the A user 10000*uaa*.

On the other hand, it is assumed that a C user 10000*uac* starts viewing the content related to the content being reproduced on the content display apparatus 100*ua*, on a portable information terminal 700*ua*, while the B user 10000*uab* is viewing the content. Here, the speaker audio output unit 751 of the portable information terminal 700*ua* reproduces the audio reproduced by the speaker 174 of the content display apparatus 100*ua*. In addition, the headphone audio output unit 752 of the portable information terminal 700*ua* reproduces the audio of the related content. In this manner, the A user 10000*uaa* and the B user 10000*uab* can view the content being reproduced on the video display 173 of the content display apparatus 100*ua*, and the C user 10000*uac* can view the related content on the portable information terminal 700*ua* without disturbing the reproduction of the content on the content display apparatus 100*ua*.

Figure 11B:
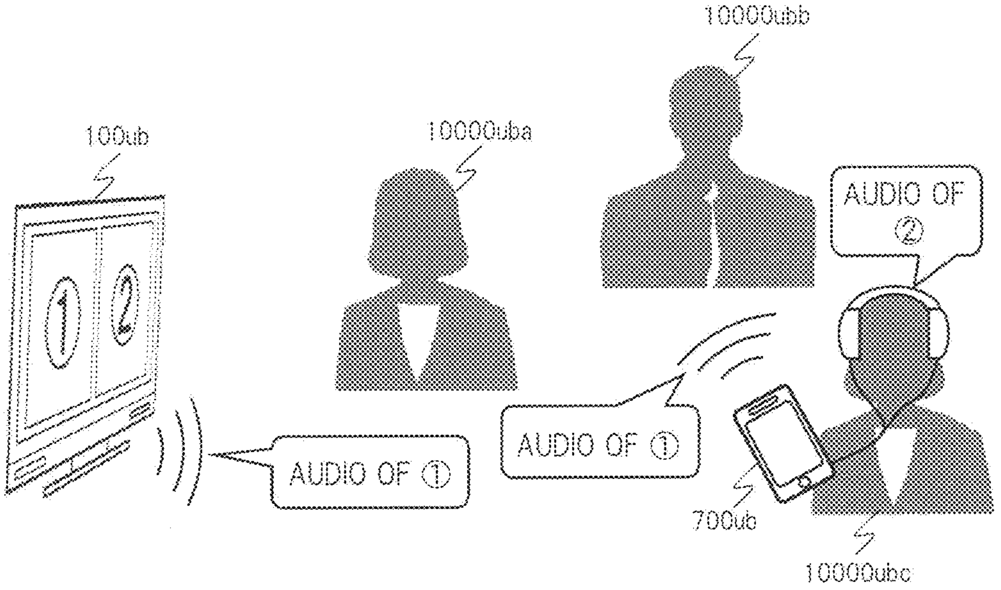
FIG. 11B is a diagram (2) showing an example of using the audio cooperative reproduction system according to the second embodiment.

FIG. 11B is a schematic diagram showing content viewing of a two-screen content display apparatus, which is an example of using the audio cooperative reproduction system of this embodiment. A content display apparatus 100*ub* includes two tuner/demodulators 131 and reproduces a first content and a second content by dividing the video display 173 into two screens.

Here, it is assumed that an A user 10000*uba* and a B user 10000*ubb* want to view the first content, while a C user 10000*ucc* wants to view the second content. Therefore, the audio of the first content is reproduced from the speaker 174 of the content display apparatus 100*ub* and the speaker audio output unit 751 of a portable information terminal 700*ub*. In addition, the audio of the second content is reproduced from the headphone audio output unit 752 of the portable information terminal 700*ub*. In this manner, the A user 10000*uba* and the B user 10000*ubb* can view the video and audio of the first content, and the C user 10000*ucc* can view the video and audio of the second content without disturbing the viewing of the other content.

Figure 12A:
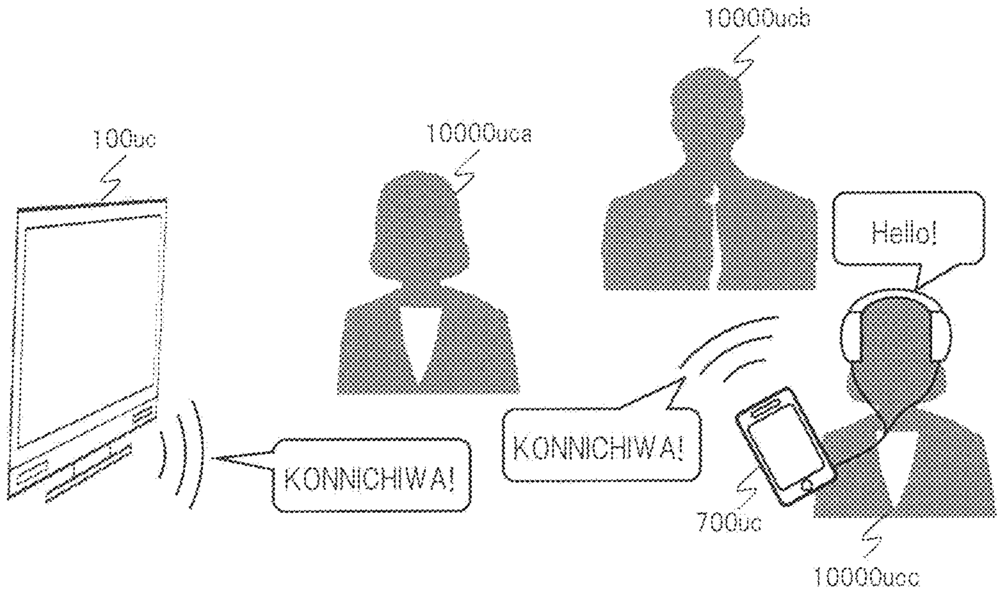
FIG. 12A is a diagram (3) showing an example of using the audio cooperative reproduction system according to the second embodiment.

FIG. 12A is a schematic diagram showing multiplexed audio content viewing, which is an example of using the audio cooperative reproduction system of this embodiment. A content display apparatus 100*uc* is reproducing multiplexed audio content including a first audio and a second audio.

Here, it is assumed that an A user 10000*uca* and a B user 10000*ucb* want to view the multiplexed audio content with the first audio, while a C user 10000*ucc* wants to view the multiplexed audio content with the second audio. Therefore, the first audio is reproduced from the speaker 174 of the content display apparatus 100*uc* and the speaker audio output unit 751 of a portable information terminal 700*uc*. Further, the second audio is reproduced from the headphone audio output unit 752 of the portable information terminal 700*uc*. In this manner, the A user 10000*uca* and the B user 10000*ucb* can view the multiplexed audio content with the first audio, and the C user 10000*ucc* can view the multiplexed audio content with the second audio without disturbing the viewing of the other content.

Figure 12B:
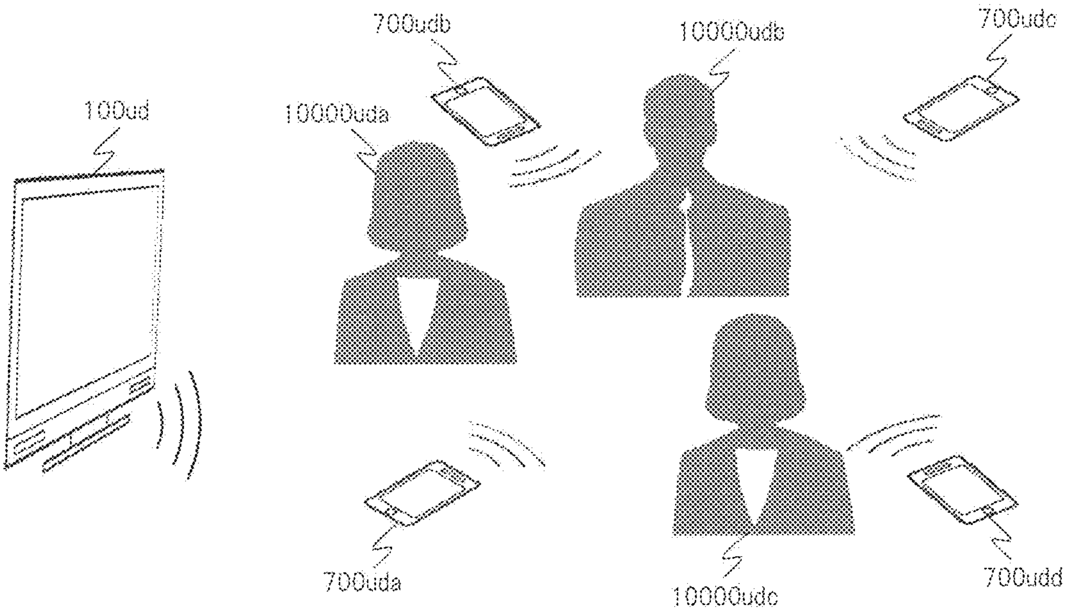
FIG. 12B is a diagram (4) showing an example of using the audio cooperative reproduction system according to the second embodiment.

FIG. 12B is a schematic diagram showing surround sound content viewing, which is an example of using the audio cooperative reproduction system of this embodiment. A content display apparatus 100*ud* is reproducing a content including surround sound such as 5.1 ch.

Here, it is assumed that an A portable information terminal 700*uda*, a B portable information terminal 700*udb*, a C portable information terminal 700*udc*, and a D portable information terminal 700*udd* are arranged around an A user 10000*uda*, a B user 10000*udb*, and a C user 10000*udc* who view the content. The content display apparatus 100*ud* transmits the surround sound to the A portable information terminal 700*uda* to the D portable information terminal 700*udd*. The A portable information terminal 700*uda* to the D portable information terminal 700*udd* reproduce each transmitted audio. In this manner, the A user 10000*uda* to the C user 10000*udc* can view the surround sound content in a highly realistic viewing environment.

Note that, as an application extension function for operating the audio cooperative reproduction system of this embodiment, it is also possible to register the number of the content display apparatus and a plurality portable information terminals and the positional of relationship therebetween, generate each audio for realizing desired surround sound viewing based on the number of the portable information terminals and the positional relationship therebetween, and transmit the audio to each portable information terminal.

As described above, according to the audio cooperative reproduction system described in the second embodiment, the audio data is transmitted from the content display apparatus 100 to the portable information terminal 700, and thus not only the content display apparatus 100 but also the audio output unit (for example, speaker audio output unit 751) of the portable information terminal 700 can output the audio. Thus, by using the portable information terminal 700 capable of selective output control of a plurality of audio contents of a plurality of audio output units, the audio cooperative reproduction system with which the viewing environment of the first content reproduced on the content display apparatus 100 can be improved and the user of the portable information terminal 700 can view the second content can be realized.

Third Embodiment

Hereinafter, the third embodiment of the present invention will be described. Note that the configuration, effects, and the like in this embodiment are the same as those in the second embodiment unless otherwise specified. For this reason, the difference between this embodiment and the second embodiment will be mainly described below, and the description of common points will be omitted as much as possible in order to avoid the duplication.

Although the embodiment in the case of implementing the audio cooperative reproduction system has been described in the second embodiment, a more detailed embodiment will be described.

When performing the audio cooperative reproduction, it is sometimes desired to construct a viewing environment in which the difference in how audio is heard depending on the difference in distance from the content display apparatus is small. In this case, it is desirable to control so that the speaker volume of the portable information terminal 700 increases as the distance from the content display apparatus to the portable information terminal 700 becomes longer.

Therefore, in this embodiment, the portable information terminal 700 receives the input of the audio output from the content display apparatus 100 and outputs the audio from the speaker audio output unit 751 based on the volume of the input audio.

Specifically, the audio input unit 754 of the portable information terminal 700 receives the input of surrounding audio (audio outside the terminal), and the audio signal processor 753 acquires the audio. The audio signal processor 753 compares the audio and audio data acquired by communication from the content display apparatus 100, specifies the audio output from the content display apparatus 100 from the input audio, and determines the volume of the audio. The audio signal processor 753 determines the volume of the audio data acquired from the content display apparatus 100 based on the determined volume and the set reference volume, and outputs the audio.

Figure 13:
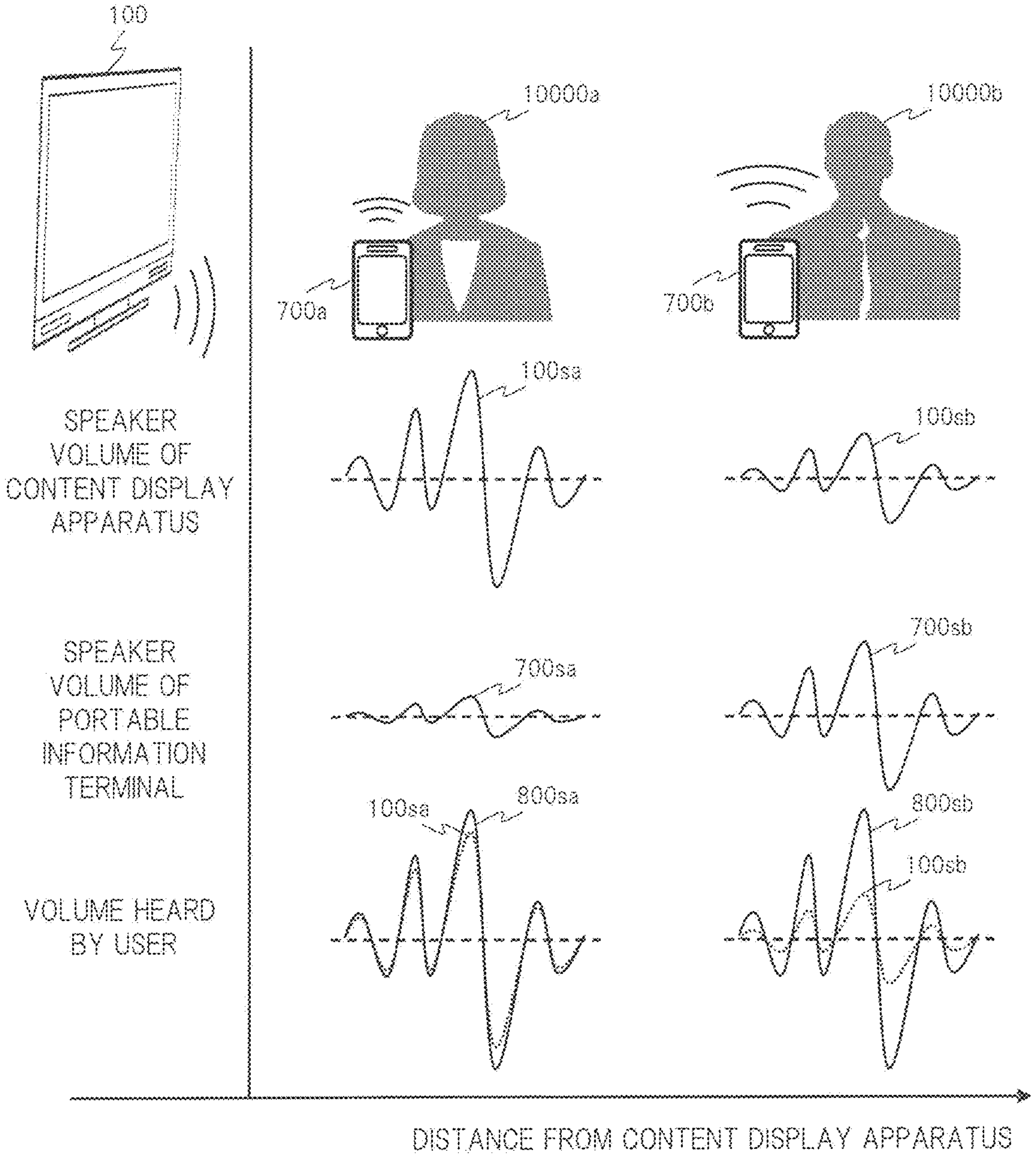
FIG. 13 is a diagram for describing an audio control of an audio cooperative reproduction system according to a third embodiment.

FIG. 13 is a schematic diagram showing an example of volume control in the audio cooperative reproduction system according to this embodiment. As the users of the content to be reproduced on the content display apparatus 100, there are an A user 10000*a* near the content display apparatus 100 and a B user 10000*b* far from the content display apparatus 100. The A user 10000*a* has an A portable information terminal 700*a* and the B user 10000*b* has a B portable information terminal 700*b*.

The A user 10000*a* listens to the audio output from the speaker 174 of the content display apparatus 100 with a speaker volume 100*sa* of the content display apparatus at the position of the A user. On the other hand, the B user 10000*b* listens to the audio output from the speaker 174 of the content display apparatus 100 with a speaker volume 100*sb* of the content display apparatus at the position of the B user. The speaker volume 100*sb* of the content display apparatus at the position of the B user is smaller than the speaker volume 100*sa* of the content display apparatus at the position of the A user, and the B user 10000*b* has more difficulty in listening to the audio output from the speaker 174 in comparison to the A user 10000*a*.

Thus, the A portable information terminal 700*a* and the B portable information terminal 700*b* cooperate with the content display apparatus 100, the A portable information terminal 700*a* reproduces the audio from the speaker audio output unit 751 with a speaker volume 700*sa* of the A portable information terminal, and the B portable information terminal 700*b* reproduces the audio from the speaker audio output unit 751 with a speaker volume 700*sb* of the B portable information terminal.

Compared with the speaker volume 700*sa* of the A portable information terminal, the speaker volume 700*sb* of the B portable information terminal is a higher volume. At this time, the volume heard by the A user 10000*a* and the B user 10000*b* is a volume 800*sa* heard by the A user and a volume 800*sb* heard by the B user, respectively. The A portable information terminal 700*a* and the B portable information terminal 700*b* control the speaker volume 700*sa* of the A portable information terminal and the speaker volume 700*sb* of the B portable information terminal so that the volume 800*sa* heard by the A user and the volume 800*sb* heard by the B user have approximately the same value.

Figure 14:
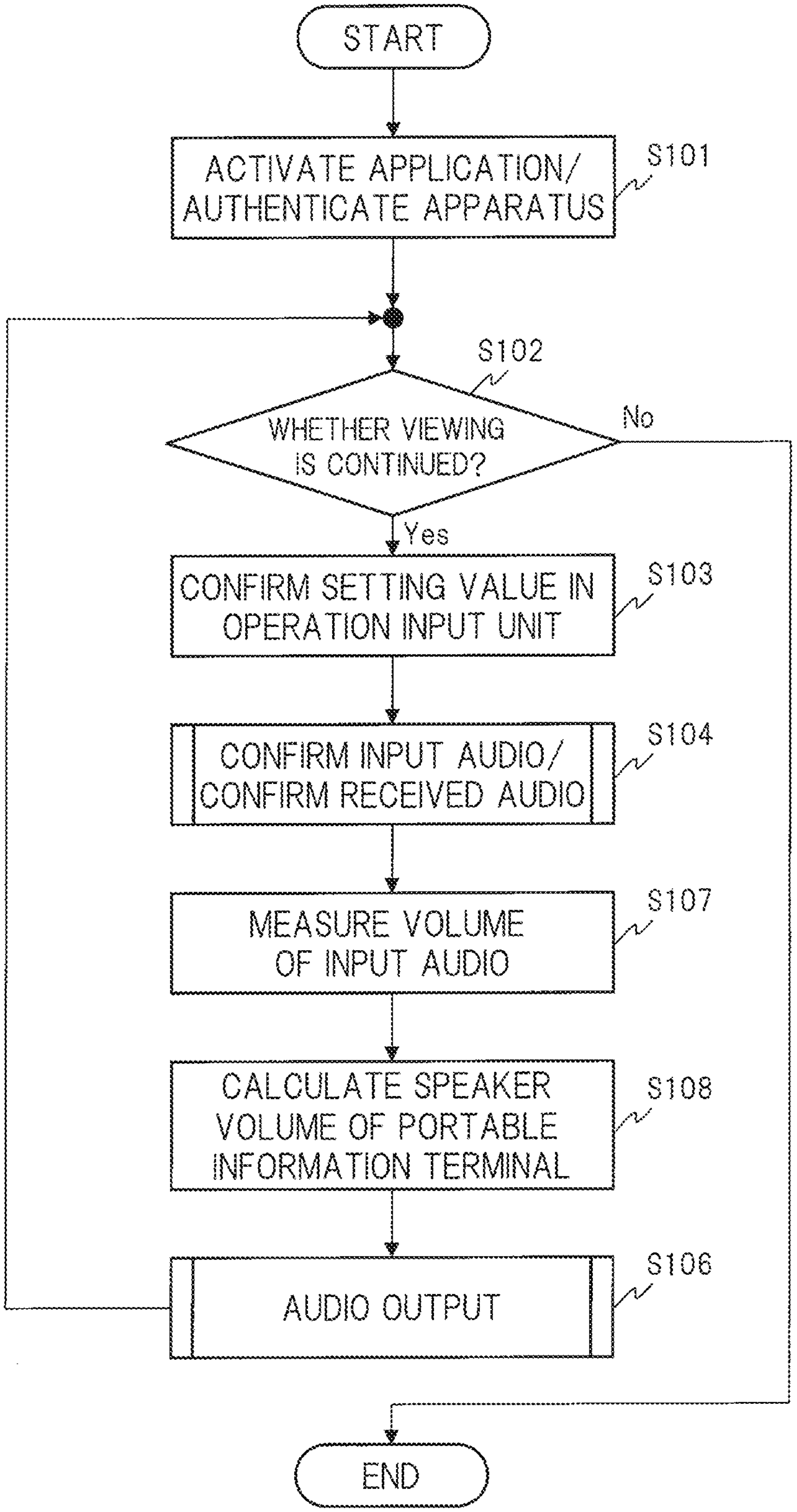
FIG. 14 is a flow chart (1) showing a process of a portable information terminal according to the third embodiment.

FIG. 14 is an operation sequence diagram showing an example of an operation sequence in which the volume control of the speaker audio output unit 751 is taken into consideration with respect to the operation sequence of the portable information terminal 700 shown in FIG. 9. Only the received audio is confirmed in the process of S105 in FIG. 9, whereas the input audio input from the audio input unit 754 is confirmed in addition to the received audio in the process of S104 in FIG. 14.

After confirming the received audio and the input audio, the audio signal processor 753 measures the volume of the input audio input from the audio input unit 754 (S107). As shown in FIG. 13, the audio signal processor 753 calculates the volume of the audio output from the speaker audio output unit 751 of the portable information terminal 700 so that the sum of the volumes of the output audio output from the speaker 174 of the content display apparatus 100 and the output audio output from the speaker audio output unit 751 of the portable information terminal 700 always takes the value close to the reproduction reference volume (S108). Then, the portable information terminal 700 outputs the audio of the calculated volume from the speaker audio output unit 751 (S106).

Figure 15:
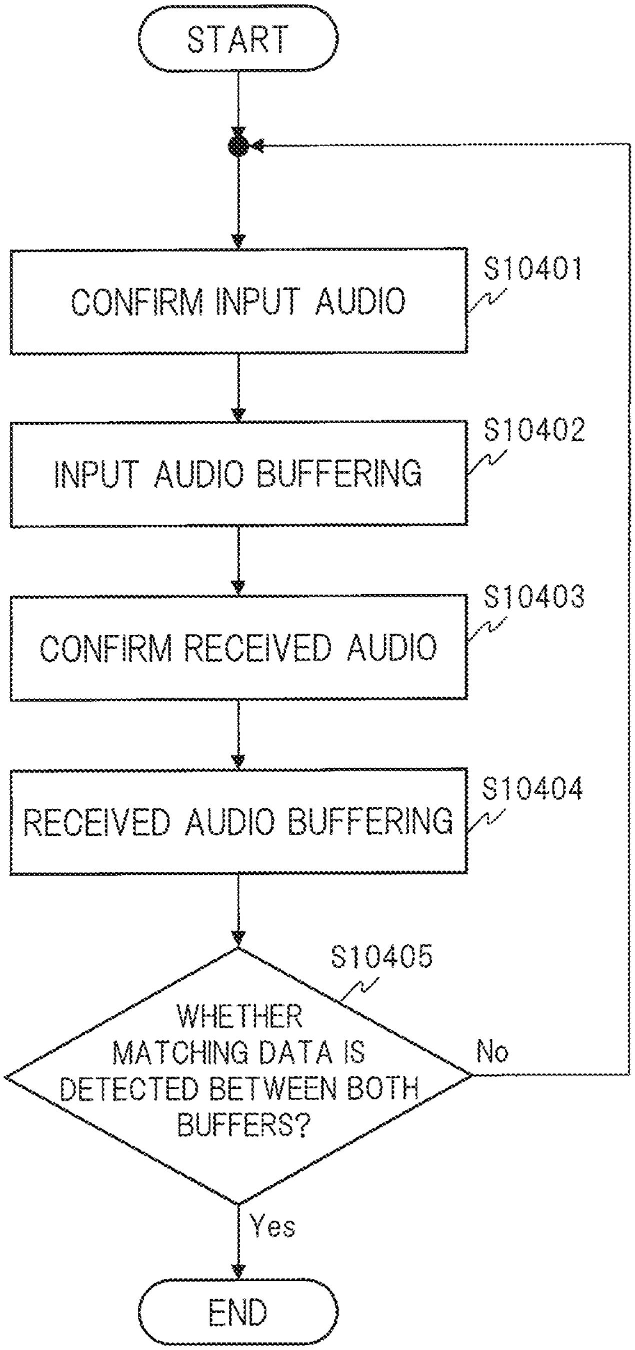
FIG. 15 is a flow chart (2) showing a process of the portable information terminal according to the third embodiment.

FIG. 15 is an operation sequence diagram showing an example of a detailed operation sequence of input audio confirmation/received audio confirmation (S104) in the example of the operation sequence of the portable information terminal 700 shown in FIG. 14. First, the audio signal processor 753 confirms the input audio input from the audio input unit 754 of the portable information terminal 700 (S10401), and stores the input audio data in a buffer capable of buffering for a predetermined time (S10402).

On the other hand, the audio signal processor 753 confirms the received audio received by the communication processor 720 of the portable information terminal 700 (S10403), and stores the received audio data in a buffer capable of buffering for a predetermined time (S10404). Then, the part determined as the same audio data is detected between both the buffer in which the input audio data is stored and the buffer in which the received audio is stored (S10405). By performing the detection, it is possible to calculate the magnitude of only the audio signal component of the audio content included in the input audio data.

It is assumed that each operation sequence in FIGS. 14 and 15 can be partially combined as appropriate, and some operation steps can be reordered and performed simultaneously with other operation steps as appropriate. In addition, it is assumed that each operation sequence in FIGS. 14 and 15 can be performed as a background operation except for the input of the user operation, and does not hinder the use of another application by the user.

When the audio signal which is the same as the audio output from the speaker 174 of the content display apparatus 100 is output from the speaker audio output unit 751 of the portable information terminal 700, the volume control is desirably set to ON in the default setting in order to reduce the difference in how the audio is heard depending on the difference in distance from the content display apparatus 100. On the other hand, when the audio signal is output from the headphone audio output unit 752, the difference in how the audio is heard depending on the difference in distance from the content display apparatus 100 is very small, and thus the volume control is desirably set to OFF in the default setting.

As described above, the speaker audio output unit 751 receives the input of the audio outside the portable information terminal 700, and the audio signal processor 753 controls the audio output based on the input audio. Specifically, the audio signal processor 753 determines and outputs the volume of received audio data based on the audio input by the speaker audio output unit 751. In this manner, the audio data can be output from the speaker audio output unit 751 with an appropriate volume even for a user who is away from the content display apparatus 100.

As described above, in the present invention, by controlling the speaker of volume the portable information terminal so as to be increased as the distance from the content display apparatus 100 to the portable information terminal 700 becomes longer, it is possible to realize the audio cooperative reproduction system in which the difference in how the audio is heard depending on the difference in distance from the content display apparatus 100 is small.

Fourth Embodiment

Hereinafter, the fourth embodiment of the present invention will be described. Note that the configuration, effects, and the like in this embodiment are the same as those in the second embodiment unless otherwise specified. For this reason, the difference between this embodiment and the second embodiment will be mainly described below, and the description of common points will be omitted as much as possible in order to avoid the duplication.

Although the embodiment in the case of implementing the audio cooperative reproduction system has been described in the second embodiment, a more detailed embodiment will be described.

When performing the audio cooperative reproduction, the reproduction timing of the audio signal output from the speaker of the content display apparatus 100 and the reproduction timing of the audio signal, which is the same as the audio signal output from the speaker of the content display apparatus 100 and is output from the speaker audio output unit 751 of the portable information terminal 700, are off in some cases. This is due to a communication delay between the content display apparatus 100 and the portable information terminal 700. In this case, in order to obtain a suitable viewing environment, it is desirable to perform the control to synchronize the reproduction timing of the same audio signal and the reproduction timing of the video reproduced by the content display apparatus.

The audio cooperative reproduction system of this embodiment is configured to adjust the reproduction timing described above. Specifically, the audio input unit 754 of the portable information terminal 700 receives the input of surrounding audio, and the audio signal processor 753 acquires and stores the audio. Further, the audio signal processor 753 stores the audio data acquired via the communication processor 720.

The audio signal processor 753 compares the audio input from the audio input unit 754 with the audio data acquired via the communication processor 720, and determines the presence or absence of matching data. When there is the matching data, the audio signal processor 753 compares the time when the audio is input and the reception time of the received data to calculate a time difference. The audio signal processor 753 adjusts the audio output timing based on the time difference.

Specifically, when the time of audio input is earlier, the audio signal processor 753 controls to delay the reproduction timing of the content display apparatus 100. Further, when the audio data is earlier, the reproduction timing of the portable information terminal 700 is delayed.

Figure 16:
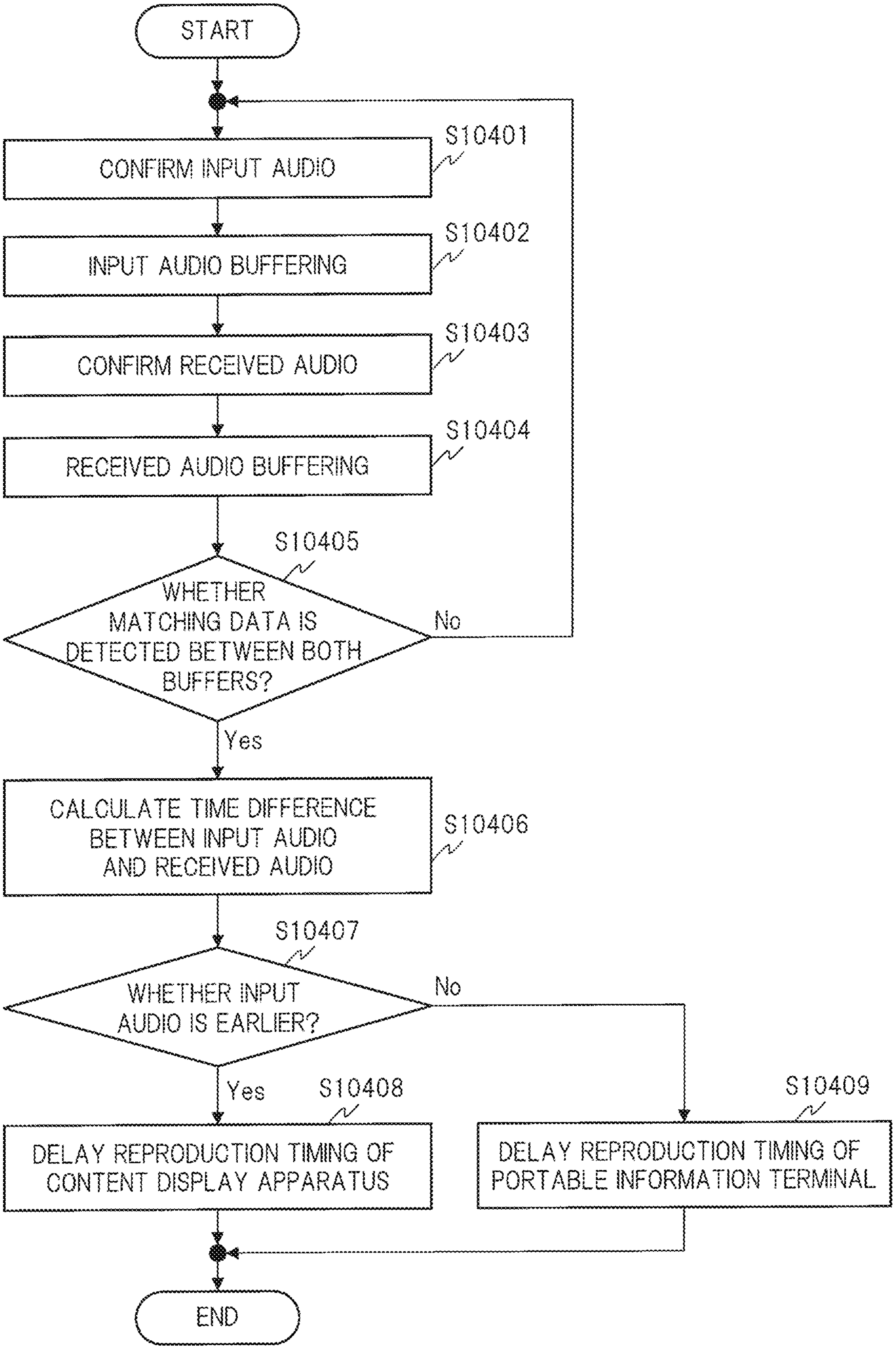
FIG. 16 is a flow chart showing a process of a portable information terminal according to a fourth embodiment.

Since the synchronization control is performed based on the input audio input from the audio input unit 754, the operation sequence of the portable information terminal 700 is as shown in FIG. 16. FIG. 16 is an example of an operation sequence in which the synchronization control is taken into consideration with respect to the detailed operation sequence of input audio confirmation/received audio confirmation (S104) shown in FIG. 15. After detecting the same part of the input audio data and the received audio data (S10405), the time difference between the audible timing of the same audio data in the input audio and the reproduction timing of the same audio data in the received audio is calculated (S10406).

Here, when the input audio is earlier, the content reproduction timing in the content display apparatus 100 is delayed (S10408). On the other hand, when the received audio is earlier, the audio reproduction timing in the speaker audio output unit 751 of the portable information terminal 700 is delayed (S10409). Since the process of S10408 can be executed only when communication from the portable information terminal 700 to the content display apparatus 100 is possible, it is effective when the system configuration shown in FIG. 5A or FIG. 5B is adopted as the audio cooperative reproduction system of this embodiment.

Figure 17:
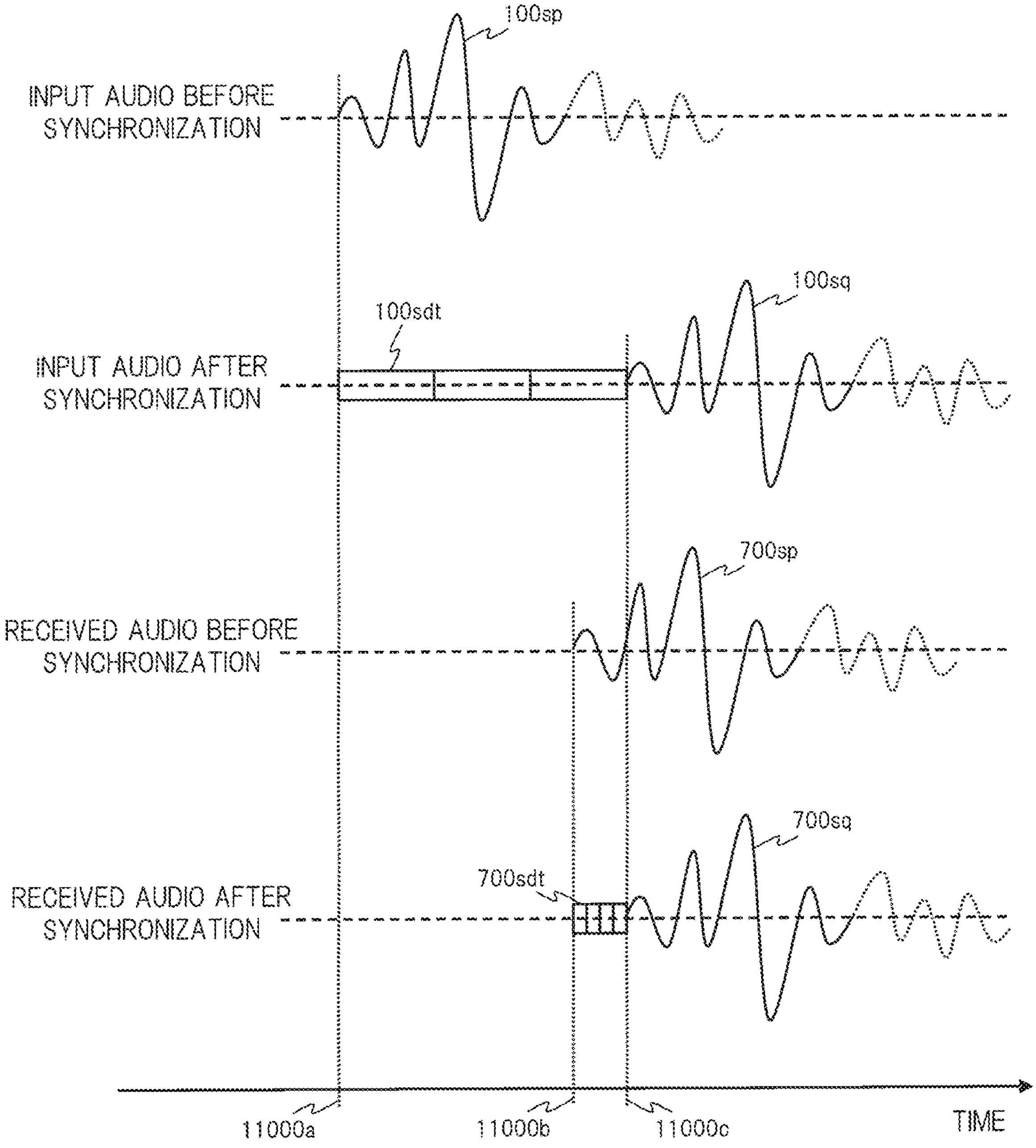
FIG. 17 is a diagram for describing a synchronization control of an audio cooperative reproduction system according to the fourth embodiment.

FIG. 17 is a schematic diagram showing an example of synchronization control in the audio cooperative reproduction system according to this embodiment. It is assumed that the BS/terrestrial digital broadcast received by the content display apparatus 100 is viewed as the content. When the transmission time between the content display apparatus 100 and the portable information terminal 700 and the like are taken into consideration, basically, the audio output from the speaker 174 of the content display apparatus 100, that is, the input audio input from the audio input unit 754 of the portable information terminal 700 is the data earlier in time than the received audio received by the communication processor 720 of the portable information terminal 700.

Thus, the audio signal processor 753 performs the process of S10408 in order to eliminate the time difference between the audible timing 11000*a* of an input audio 100*sp* before synchronization and the reproduction timing 11000*b* of a received audio 700*sp* before synchronization. In the process of S10408, first, an instruction to delay the content reproduction timing in the content display apparatus 100 is transmitted to the external communication unit 103 of the content display apparatus 100, and the content display apparatus 100 that has received the instruction delays the reproduction timing of the speaker 174 and the video display 173 with a resolution 100*sdt* of about 50 msec by using a lip-sync technology or the like.

However, if the audible timing of the input audio and the reproduction timing of the received audio are not synchronized in a finer order in consideration of the propagation delay of the audio in the air and others, the user will sound like an echo. Therefore, the audio signal processor 753 delays the reproduction timing of the speaker 174 based on the resolution 100*sdt* so that the audible timing of the input audio becomes later than the reproduction timing of the received audio, and at the same time, the audio signal processor 753 delays the reproduction timing in the speaker audio output unit 751 of the portable information terminal 700 with a finer resolution 700*sdt* of about 20 usec.

The audible timing of the synchronized input audio 100*sq* delayed based on the resolution 100*sdt* and the reproduction timing of the synchronized received audio 700*sq* delayed based on the resolution 700*sdt* coincide with each other at the synchronized timing 11000*c*, and the user can view the content in the viewing environment where the echo is reduced.

When viewing the streaming content received by the content display apparatus 100 as the content in the audio cooperative reproduction system of this embodiment, the synchronization control can be similarly performed based on the operation sequence shown in FIG. 16. Unlike the case of viewing the BS/terrestrial digital broadcast, the reproduction timing of the content display apparatus 100 may be delayed by controlling a program for streaming in the process of S10408.

The case where streaming content or one-segment broadcast content received by the portable information terminal 700 is viewed as the content in the audio cooperative reproduction system of this embodiment is assumed. In this case, when the transmission time from the portable information terminal 700 to the content display apparatus 100 and the like are taken into consideration, basically, the reproduction timing of the audio output from the speaker 174 of the content display apparatus 100 is later in time than the reproduction timing of the audio output from the speaker audio output unit 751 of the portable information terminal 700. Therefore, synchronization control can be performed only by the process of S10409 for delaying the reproduction timing of the portable information terminal 700.

It is assumed that each operation sequence in FIG. 16 can be partially combined as appropriate, and some operation steps can be reordered and performed simultaneously with other operation steps as appropriate. In addition, it is assumed that each operation sequence in FIG. 16 can be performed as a background operation except for the input of the user operation, and does not hinder the use of another application by the user.

Even when two or more portable information terminals 700 cooperate with one content display apparatus 100 to construct the audio cooperative reproduction system of this embodiment, the synchronization control of audio, video, and others is possible in all these apparatuses by performing the synchronization control based on the operation sequence shown in FIG. 16.

In any case where the audio signal which is the same as the audio output from the speaker 174 of the content display apparatus 100 is output from the speaker audio output unit 751 or the headphone audio output unit 752 of the portable information terminal 700, the synchronization control is desirably set to ON in the default setting in order to synchronize the reproduction timing with the video reproduced by the content display apparatus 100.

As described above, in this embodiment, the audio signal processor 753 specifies the timing input by the audio input unit 754 and controls the timing of output to the speaker audio output unit 751 based on the specified timing. In this manner, the output timing of the audio output from the content display apparatus 100 and the audio output from the portable information terminal 700 can be adjusted appropriately, and the suitable adjustment can be made even when the reception timings are off due to, for example, the communication delay.

Fifth Embodiment

Hereinafter, the fifth embodiment of the present invention will be described. Note that the configuration, effects, and the like in this embodiment are the same as those in the second to fourth embodiments unless otherwise specified. For this reason, the difference between this embodiment and the second to fourth embodiments will be mainly described below, and the description of common points will be omitted as much as possible in order to avoid the duplication.

Although the embodiment in the case of implementing the audio cooperative reproduction system has been described in the second to fourth embodiments, a more detailed embodiment will be described.

When performing the audio cooperative reproduction, it is sometimes desired to analyze the surrounding sound in addition to the audio of the content to be reproduced and control the volume of the content audio in accordance with the surrounding situation. For example, when a user who is viewing a content is talked to by anyone, it is desirable to lower the volume of the speaker of the portable information terminal so that the conversation can be easily heard. On the other hand, for example, when the living sound around a user who is viewing a content is loud, it is desirable to increase the volume of the speaker of the portable information terminal in order to make it easy to hear the audio of the content.

The audio cooperative reproduction system of this embodiment is configured to analyze the type of surrounding sound and control the volume of output audio based on the type. Specifically, the audio input unit 754 of the portable information terminal 700 receives the input of the surrounding audio, and the audio signal processor 753 acquires and stores the audio. Further, the audio signal processor 753 stores the audio data acquired via the communication processor 720.

The audio signal processor 753 compares the audio input from the audio input unit 754 with the audio data acquired via the communication processor 720, extracts a matching part, and extracts an unmatching part (surrounding sound part) from the audio input from the audio input unit 754. The audio signal processor 753 specifies the type of surrounding sound (for example, conversation, surrounding noise), determines the audio output volume of the received audio data in accordance with the specified type of surrounding sound, and outputs the audio based on the volume.

Figure 18:
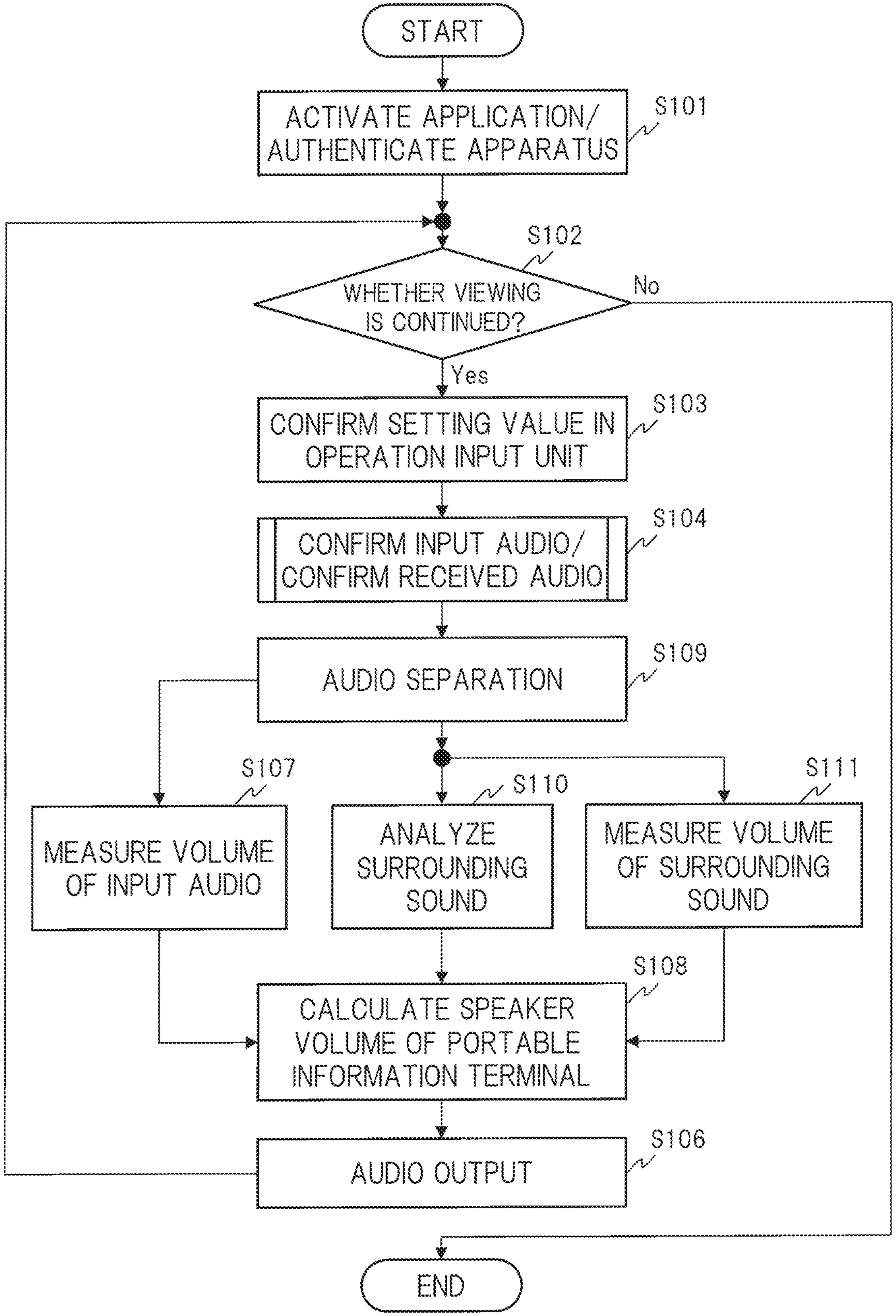
FIG. 18 is a flow chart showing a process of a portable information terminal according to a fifth embodiment.

In this embodiment, a procedure for implementing the above-described detailed embodiment will be described. FIG. 18 is an operation sequence diagram showing an example of an operation sequence in which volume control based on analysis of surrounding sound is taken into consideration with respect to the operation sequence of the portable information terminal 700 shown in FIG. 9. In the process of S104, when the data matching with the received audio, that is, the audio of the content is detected from the input audio input from the audio input unit 754, the audio of the content and the surrounding sound are separated from the input audio (S109).

The audio signal processor 753 performs type analysis as to whether the main component included in the surrounding sound is, for example, conversation or living sound based on the separated surrounding sound (S110). On the other hand, the audio signal processor 753 measures the volume of surrounding (S111), the sound and calculates the volume of the audio output from the speaker audio output unit 751 of the portable information terminal 700 in consideration of the type analysis result and the volume of the surrounding sound in the process of S108.

As an example of the volume control method, when the type analysis result of the surrounding sound is, for example, conversation, the audio output from the speaker audio output unit 751 is uniformly set to a predetermined low volume, and when the type analysis result of the surrounding sound is, for example, living sound, the audio output from the speaker audio output unit 751 is controlled so that the volume of the audio increases as the volume of the living sound becomes higher.

Here, the audio separation (S109), the analysis of surrounding sound (S110), and the like may be performed inside the portable information terminal 700 or may be performed in a server on the Internet. If the process of S109, S110, and others requires a long processing time, the maximum value of the processing time is estimated in advance, and the maximum value of the processing time is taken into consideration in the synchronization control in the process of S104. Then, the time difference with the input audio may be calculated in consideration of the maximum value of the processing time, that is, the time from the confirmation of the received audio (S10403) to the analysis of the surrounding sound and the actual output (S106) in the process of S10406 shown in FIG. 16.

It is assumed that each operation sequence in FIG. 18 can be partially combined as appropriate, and some operation steps can be reordered and performed simultaneously with other operation steps as appropriate. In addition, it is assumed that each operation sequence in FIG. 18 can be performed as a background operation except for the input of the user operation, and does not hinder the use of another application by the user.

As described above, since the audio signal processor 753 extracts the surrounding sound, analyzes the type of the surrounding sound, and controls the output volume based on the analysis result, the volume control in accordance with the surrounding situation is possible.

As described above, according to the present invention, it is possible to realize the audio cooperative reproduction system that can analyze the surrounding sound and control the volume of content audio in accordance with the surrounding situation.

Sixth Embodiment

Hereinafter, the sixth embodiment of the present invention will be described. Note that the configuration, effects, and the like in this embodiment are the same as those in the second to fourth embodiments unless otherwise specified. For this reason, the difference between this embodiment and the second to fourth embodiments will be mainly described below, and the description of common points will be omitted as much as possible in order to avoid the duplication.

Although the embodiment in the case of implementing the audio cooperative reproduction system has been described in the second to fourth embodiments, a more detailed embodiment will be described.

A user sometimes wishes to make a call with a portable information terminal when viewing a content with the audio cooperative reproduction system. In this case, in order to deliver clear audio to the person on the other end of the line, it is desirable to increase the component of the call content included in the audio input from the microphone or to reduce the audio component of the content being viewed as much as possible.

As an example of the former method, there is a method in which the call content component included in the audio input from the microphone and the audio component of the content being viewed are separated by applying the audio separation process (S109) in the fifth embodiment and only the call content component thereof is amplified. As an example of the latter method, a method in which the audio component of the content being viewed included in the audio input from the microphone is cancelled by using the received audio information received for output from the speaker audio output unit 751 is conceivable.

The audio cooperative system according to this embodiment is configured to appropriately control the call audio (input audio by calling) when the portable information terminal 700 performs a calling process while outputting the audio data received from the content display apparatus 100. Specifically, the audio signal processor 753 makes a determination by inquiring of the main controller 701 about a call state and acquiring information indicating whether or not a call is in progress from the main controller 701. The audio signal processor 753 performs the phase inversion of the received audio data and the amplitude adjustment based on the volume of the audio component of the content input to the audio input unit 754, and adds it to the outgoing audio of the user.

Figure 19:
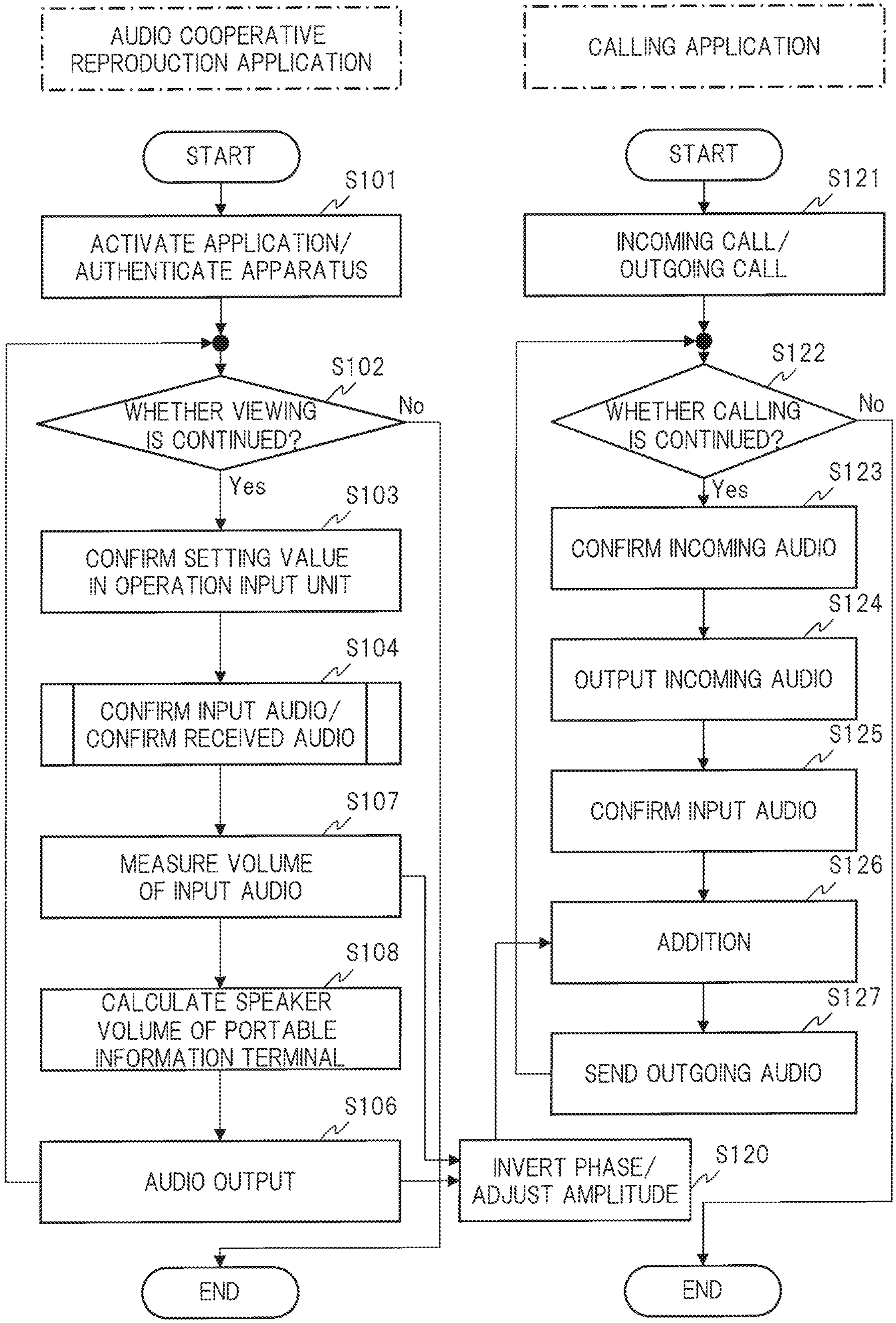
FIG. 19 is a flow chart showing a process of a portable information terminal according to a sixth embodiment.

In this embodiment, a procedure for implementing the above-described detailed embodiment will be described. FIG. 19 is an operation sequence diagram showing an example of an operation sequence in which the cooperative operation of the application for operating the audio cooperative reproduction system of this embodiment and the calling application is taken into consideration with respect to the operation sequence of the portable information terminal 700 shown in FIG. 9. The calling application starts a processing loop when an incoming call or outgoing call is made (S121). First, the calling application confirms incoming audio (S123) and outputs the incoming audio from a receiver (S124). On the other hand, the calling application confirms an outgoing audio of the user from the audio input unit 754 (S125).

Here, when transmitting the outgoing audio, the audio of the content output from the speaker audio output unit 751 of the portable information terminal 700 operating as the audio cooperative reproduction system is used. Specifically, the audio signal processor 753 performs phase inversion of the audio of the content output from the speaker audio output unit 751 in the process of S106 and amplitude adjustment based on the volume of the audio component of the content included in the outgoing audio (S120). Then, the audio signal processor 753 reduces the audio component of the content included in the outgoing audio by the addition (S126) to the outgoing audio of the user confirmed in the process of S125, thereby making it possible to generate the clear outgoing audio. Then, the clear outgoing audio is sent (S127).

Whether or not to continue the call is constantly monitored in the processing loop of S123 to S127 (S122), and the call of this embodiment is ended when an end call request is input from the operation unit 730 or the partner of the call requests the end of call.

It is assumed that each operation sequence in FIG. 19 can be partially combined as appropriate, and some operation steps can be reordered and performed simultaneously with other operation steps as appropriate. In addition, it is assumed that each operation sequence in FIG. 19 can be performed as a background operation except for the input of the user operation, and does not hinder the use of another application by the user.

As in the above-described embodiment, the audio signal processor 753 is configured to emphasize the call audio included in the audio input by the audio input unit 754 based on the audio input by the audio input unit 754 and the audio data acquired via the communication processor 720. Specifically, the audio signal processor 753 adds the result of inverting the phase of the audio data received by the communication processor 720 to the audio input by the audio input unit 754 as the emphasizing process. In this manner, since the audio signal processor 753 performs a process of weakening a part of the received audio data (audio content), the call can be made with clear audio even when the content is being viewed.

Note that, as described in the embodiment above, the audio signal processor 753 may be configured to separate the call content component included in the audio input from the microphone and the audio component of the content being viewed by performing the audio separation process in the fifth embodiment, and amplify only the call content component (call audio part) thereof. In this case, since the audio signal processor 753 emphasizes the call content part, the call with clear audio can be made even when the content is being viewed.

Seventh Embodiment

Hereinafter, the seventh embodiment of the present invention will be described. Note that the configuration, effects, and the like in this embodiment are the same as those in the second to fourth embodiments unless otherwise specified. For this reason, the difference between this embodiment and the second to fourth embodiments will be mainly described below, and the description of common points will be omitted as much as possible in order to avoid the duplication.

Although the embodiment in the case of implementing the audio cooperative reproduction system has been described in the second to fourth embodiments, a more detailed embodiment will be described.

It is sometimes desired to not only reproduce audio but also display video or subtitles on the portable information terminal while viewing a content with the audio cooperative reproduction system. In particular, with regard to subtitles, some users consider subtitles superimposed on the video as an obstacle when they are displayed on a content display apparatus viewed by a plurality of users. In this case, for example, it is desirable not to display the subtitles on the content display apparatus, but to display the subtitles only on the portable information terminals possessed by the users who need the subtitles.

In the audio cooperative system of this embodiment, the portable information terminal 700 is configured to receive subtitle data related to the audio data and display the subtitle data.

Figure 20:
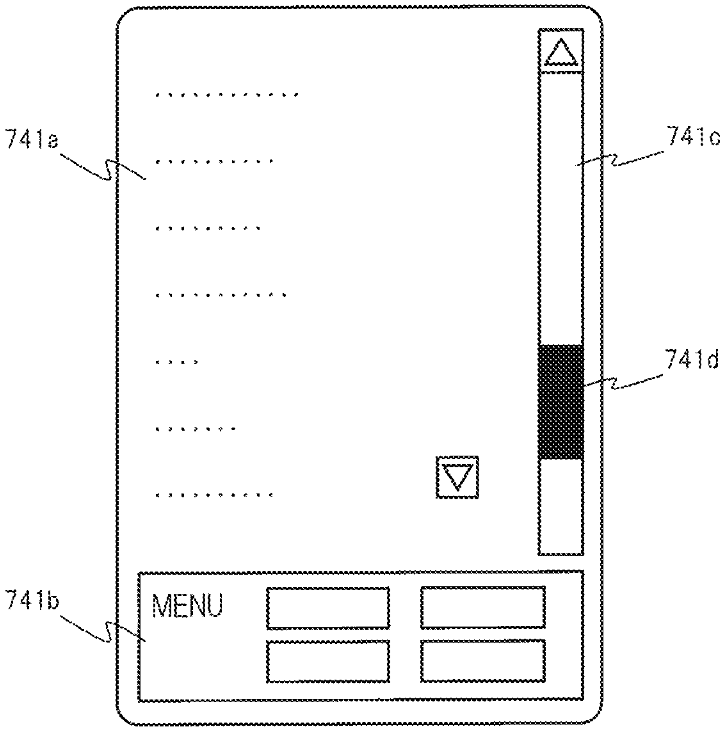
FIG. 20 is a diagram showing an example of a subtitle display of an audio cooperative reproduction system according to a seventh embodiment.

In this embodiment, a procedure for implementing the above-described detailed embodiment will be described. FIG. 20 is an example of a display screen on the display 741 of the portable information terminal 700. The display 741 has a touch panel function and serves also as the operation unit 730. First, in a menu 741*b*, the user selects whether or not to display video and subtitles. When the user selects to display the subtitles, subtitles 741*a* are displayed.

The subtitle data within a predetermined time can be traced back by sliding the subtitles 741*a* up and down by using the touch panel function, and even if the user temporarily overlooks and misses hearing the content, it is possible to know the contents of the missed part without stopping the reproduction of the content. The subtitles 741*a* to be displayed can be moved by operating a tab 741*d* indicating the current subtitle position on a scroll bar 741*c*.

As described above, according to the present invention, it is possible to realize the audio cooperative reproduction system capable of not only reproducing audio but also displaying video or subtitles on the portable information terminal.

Eight Embodiment

Hereinafter, the eighth embodiment the present invention will be described. Note that the configuration, effects, and the like in this embodiment are the same as those in the second to fourth embodiments unless otherwise specified. For this reason, the difference between this embodiment and the second to fourth embodiments will be mainly described below, and the description of common points will be omitted as much as possible in order to avoid the duplication.

Although the embodiment in the case of implementing the audio cooperative reproduction system has been described in the second to fourth embodiments, a more detailed embodiment will be described.

When performing the audio cooperative reproduction, no language understandable by the viewing user is included in one or more kinds of audio and one or more kinds of subtitles of the content to be reproduced in some cases. In this case, it is desirable that any of one or more kinds of audio and one or more kinds of subtitles is translated and provided as the audio or subtitles in a language understandable by the user.

In this embodiment, the portable information terminal 700 is configured to receive subtitle data and request translation of the received subtitle data to an external server (translator), and the external server translates the subtitle data in accordance with the translation request and displays the translation result or outputs audio. Note that the portable information terminal 700 itself may include translation means.

In this embodiment, a procedure for implementing the above-described detailed embodiment will be described. FIG. 21 is a diagram showing an example of various processes required for various translation patterns. As the translation patterns, there are two patterns of "subtitles" and "audio" as the data before translation and there are two patterns of "subtitles" and "audio" as the data after translation, so that four (2×2=4) patterns can be taken as the combinations of the translation patterns.

Specifically, as shown in FIG. 21, these are a translation pattern 23000 from subtitle to subtitle, a translation pattern 23001 from subtitle to audio, a translation pattern 23002 from audio to subtitle, and a translation pattern 23003 from audio to audio. In general, since translation is performed on a text basis in many cases, a speech-to-text process 23004 for converting audio into text, a text-based translation process 23005, and a text-to-speech process 23006 for converting text into audio are required as the processes for the translation of the four patterns. By applying the three types of processes as shown in FIG. 21, the translation of the four patterns becomes possible.

The translation pattern 23002 from audio to subtitle and the translation pattern 23003 from audio to audio are executed after confirming the received audio in the process of S104 in the operation sequence of the portable information terminal 700 shown in FIG. 14. Since the translation pattern 23000 from subtitle to subtitle and the translation pattern 23001 from subtitle to audio are also executed by using subtitles transmitted at the same timing as the audio, these are executed at the same timing as the translation patterns executed by using audio. Here, the speech-to-text process 23004 and the text-to-speech process 23006 may be performed inside the portable information terminal 700 or may be performed in a server on the Internet.

Since the subtitles or audio after translation are the data that are not originally included in the content, the provision timing to the user cannot be strictly synchronized unlike the operation sequence shown in FIG. 16, but it is desirable to be roughly synchronized with the video of the content. Therefore, if the speech-to-text process 23004 or the text-to-speech process 23006 requires a long processing time, the maximum processing time is estimated in advance. Then, in the synchronization control in the process of S104, the maximum value of the processing time is taken into consideration, and the time difference from the input audio may be calculated in consideration of the maximum value of the processing time, that is, the time from when the received audio is confirmed (S10403) and the translation is performed to time when the output is actually performed (S106), in the process of S10406 shown in FIG. 16.

The setting shown in FIG. 21 is merely an example, and the audio-based translation process capable of translation from audio to audio is also allowed instead of the text-based translation process.

As described above, according to the present invention, it is possible to realize the audio cooperative reproduction system capable of performing translation using any of one or more kinds of audio and one or more kinds of subtitles and providing audio or subtitles in the language understandable by the user.

In the foregoing, the first to eighth embodiments of the present invention have been described, but it is needless to say that the configuration for implementing the technology of the present invention is not limited to the above-described embodiments and various modifications are conceivable. For example, a part of the configuration of one embodiment may be replaced with the configuration of another embodiment, and the configuration of one embodiment may be added to the configuration of another embodiment. These all belong to the range of the present invention. In addition, numerical values, messages, and the like appearing in the sentences and drawings are also merely examples, and the use of different ones does not impair the effects of the present invention.

For example, the portable information terminal 700 may be configured to calculate the distance between the portable information terminal 700 and the content display apparatus 100 by short-range wireless communication means (for example, beacon) and control the volume of the output of received audio data based on the calculated result. For example, the portable information terminal 700 may be configured to store information that determines the volume in accordance with the distance, specify the volume corresponding to the calculated distance with reference to the information, and output the audio data with the specified volume.

In this case, if the volume of the portable information terminal 700 is set so as to be increased when the distance is long, even when the portable information terminal 700 is far from the content display apparatus 100, the viewing environment can be improved because audio data is output with a high volume from the portable information terminal 700.

In addition, the content display apparatus 100 may be configured so that, when accepting a change in the content to be received, the content display apparatus 100 transmits the audio data of the content after the change to the portable information terminal 700. Also, the content display apparatus 100 may be configured so that, when accepting a change in the content to be received, the content display apparatus 100 transmits the content before the change to the portable information terminal 700.

Note that whether or not the audio data to be transmitted to the portable information terminal 700 is changed in accordance with the change in the content to be received that the content display apparatus 100 has accepted may be determined in advance, or may be inquired of the portable information terminal 700.

Some or all of the functions and the like of the present invention described above may be implemented in hardware by, for example, designing them with integrated circuits. Alternatively, they may be implemented in software by interpreting and executing the operation program to implement the functions and the like by a microprocessor unit or the like. It is also possible to use hardware and software in combination.

In addition, as to the control lines and information lines shown in the drawings, those considered necessary for the description are shown, and they do not necessarily indicate all the control lines and information lines in the product. Actually, it may be considered that almost all the components are connected to each other.

In addition, as to the control lines and information lines shown in the drawings, those considered necessary for the description are shown, and they do not necessarily indicate the all control lines and information lines in the product. Actually, it may be considered that almost all the components are connected to each other.

REFERENCE SIGNS LIST

100 . . . content display apparatus, 100*a* . . . antenna, 100*b* . . . external transmitting apparatus, 100*b*1 . . . main controller, 100*b*2 . . . system bus, 100*b*3 . . . audio input unit, 100*b*4 . . . external signal transmitter, 101 . . . main controller, 102 . . . system bus, 103 . . . external communication unit, 131 . . . tuner/demodulator, 132 . . . separator, 173 . . . video display, 174 . . . speaker, 200 . . . . Internet, 210 . . . router, 300*t* . . . radio tower of broadcasting station, 600*b* . . . base station of mobile phone communication network, 700 . . . portable information terminal, 701 . . . main controller, 702 . . . system bus, 720 . . . communication processor, 721 . . . . LAN communication unit, 722 . . . mobile phone network communication unit, 723 . . . NFC communication unit, 730 . . . operation unit, 740 . . . image processor, 741 . . . display, 742 . . . image signal processor, 743 . . . first image input unit, 744 . . . second image input unit, 750 . . . audio processor, 751 . . . speaker audio output unit, 752 . . . headphone audio output unit, 753 . . . audio signal processor, 754 . . . audio input unit

The invention claimed is:

1. An audio terminal comprising:

a wireless communication interface configured to acquire an audio content;

a speaker configured to output the audio content;

a controller configured to control the speaker based on setting information including first information relating to output pattern of the audio content and second information relating to whether volume control function of the speaker is turned on or off, the output pattern at least including a first pattern of which the audio content is not outputted and a second pattern of which the audio content is outputted from the speaker; and a microphone configured to capture a surrounding sound of an audio output terminal, wherein the controller is configured to analyze a surrounding sound captured via the microphone, specify a type of the surrounding sound, and control a volume of the speaker based on the setting information and the type of the surrounding sound of the audio output terminal, and wherein the controller is further configured to perform a control process to delay output of the audio content for a period of time after capturing the surrounding sound via the microphone, and then control the speaker to output the audio content.

2. The audio terminal according to claim 1, wherein the controller is configured to control to turn up or down the volume of the speaker based on the setting information and the type of the surrounding sound of the audio output terminal.

3. The audio terminal according to claim 1, wherein, when the specified type of surrounding sound is related to conversation, the controller is configured to control the volume of the speaker so that the conversation is heard.

4. The audio terminal according to claim 1, wherein, when the specified type of surrounding sound is related to conversation, the controller is configured to control to turn down the volume of the speaker.

5. The audio terminal according to claim 1, wherein the period of time is estimated in advance.

6. An audio terminal comprising:

a wireless communication interface configured to acquire an audio content;

a speaker configured to output the audio content;

a controller configured to control the speaker based on setting information including first information relating to output pattern of the audio content and second information relating to whether volume control function of the speaker is turned on or off, the output pattern at least including a first pattern of which the audio content is not outputted and a second pattern of which the audio content is outputted from the speaker; and a microphone configured to capture a surrounding sound of an audio output terminal, wherein, after capturing the surrounding sound via the microphone, the controller is configured to:

analyze the surrounding sound and specify a type of the surrounding sound;

control a volume of the speaker based on the setting information and the type of the surrounding sound of the audio output terminal; and perform a control process to delay output of the audio content for a period of time before outputting the audio content by the speaker.

7. The audio terminal according to claim 6, wherein the controller is configured to control to turn up or down the volume of the speaker based on the setting information and the type of the surrounding sound of the audio output terminal.

8. The audio terminal according to claim 6, wherein, when the specified type of surrounding sound is related to conversation, the controller is configured to control the volume of the speaker so that the conversation can be easily heard.

9. The audio terminal according to claim 6, wherein, when the specified type of surrounding sound is related to conversation, the controller is configured to control to turn down the volume of the speaker.

10. The audio terminal according to claim 6, wherein the period of time is estimated in advance.

11. A method for controlling an audio terminal, wherein the audio terminal comprises: a wireless communication interface configured to acquire an audio content; a speaker configured to output the audio content; and a microphone configured to capture a surrounding sound of an audio output terminal, the method comprising:

controlling the speaker based on setting information including first information relating to output pattern of the audio content and second information relating to whether volume control function of the speaker is turned on or off, the output pattern at least including a first pattern of which the audio content is not outputted and a second pattern of which the audio content is outputted from the speaker;

analyzing a surrounding sound captured via the microphone;

specifying a type of the surrounding sound;

controlling a volume of the speaker based on the setting information and the type of the surrounding sound of the audio output terminal; and performing a control process to delay output of the audio content for a period of time after capturing the surrounding sound via the microphone, and then controlling the speaker to output the audio content.

12. The method according to claim 11, further comprising turning up or down the volume of the speaker based on the setting information and the type of the surrounding sound of the audio output terminal.

13. The method according to claim 11, further comprising, when the specified type of surrounding sound is related to conversation, controlling the volume of the speaker so that the conversation is heard.

14. The method according to claim 11, further comprising, when the specified type of surrounding sound is related to conversation, turning down the volume of the speaker.

15. The method according to claim 11, wherein the period of time is estimated in advance.

16. A method for controlling an audio terminal, wherein the audio terminal comprises: a wireless communication interface configured to acquire an audio content; a speaker configured to output the audio content; and a microphone configured to capture a surrounding sound of an audio output terminal, the method comprising:

controlling the speaker based on setting information including first information relating to output pattern of the audio content and second information relating to whether volume control function of the speaker is turned on or off, the output pattern at least including a first pattern of which the audio content is not outputted and a second pattern of which the audio content is outputted from the speaker; and after capturing the surrounding sound via the microphone, analyzing the surrounding sound and specifying a type of the surrounding sound, controlling a volume of the speaker based on the setting information and the type of the surrounding sound of the audio output terminal, and performing a control process to delay output of the audio content for a period of time before outputting the audio content by the speaker.

17. The method according to claim 16, further comprising turning up or down the volume of the speaker based on the setting information and the type of the surrounding sound of the audio output terminal.

18. The method according to claim 16, further comprising, when the specified type of surrounding sound is related to conversation, controlling the volume of the speaker so that the conversation is heard.

19. The method according to claim 16, further comprising turning down the volume when the specified type of surrounding sound is related to conversation, of the speaker.

20. The method according to claim 16, wherein the period of time is estimated in advance.

* * * * *